(12) United States Patent
Erignac

(10) Patent No.: US 8,374,391 B1
(45) Date of Patent: Feb. 12, 2013

(54) MODEL OF VISIBILITY OF TARGETS

(75) Inventor: Charles A. Erignac, Seattle, WA (US)

(73) Assignee: The Boeing Company, Chicago, IL (US)

( * ) Notice: Subject to any disclaimer, the term of this patent is extended or adjusted under 35 U.S.C. 154(b) by 482 days.

(21) Appl. No.: 12/761,565

(22) Filed: Apr. 16, 2010

(51) Int. Cl.
*G06K 9/00* (2006.01)

(52) U.S. Cl. ......... 382/103; 382/154; 382/291; 345/421

(58) Field of Classification Search .............. 382/103, 382/106, 154, 291; 348/143, 144, 159; 345/418, 345/421; 703/2; 356/4.01
See application file for complete search history.

(56) References Cited

U.S. PATENT DOCUMENTS

| | | | |
|---|---|---|---|
| 7,668,700 B2 | 2/2010 | Erignac et al. | |
| 2008/0021680 A1* | 1/2008 | Elsberg et al. | 703/2 |
| 2009/0185719 A1 | 7/2009 | Erignac | |

OTHER PUBLICATIONS

Tsai et al., "Visibility and its dynamics in a PDE based implicit framework", Journal of Computational Physics, 2004, Elsevier Inc, pp. 260-290.

\* cited by examiner

*Primary Examiner* — Andrews W Johns
(74) *Attorney, Agent, or Firm* — Yee & Associates, P.C.

(57) ABSTRACT

A method and apparatus for identifying visibility of targets. A first function is selected to indicate whether locations in an environment are at a surface for objects in the environment, outside the surface, or inside the surface. First volumes are formed for the environment. Each volume in the first volumes has a size selected such that a difference between first interpolated values for each volume and first values generated using the first function for each volume is within a threshold. Second volumes are formed for the environment. Each of the second volumes has a size selected such that a difference between second interpolated values for each volume and second values generated using a second function for each volume is within a threshold. The second values are minimum values along lines from each volume in the second number of volumes to a target in the environment.

20 Claims, 19 Drawing Sheets

MODEL OF VISIBILITY OF TARGETS

BACKGROUND INFORMATION

1. Field

The present disclosure relates generally to identifying the visibility of targets and, in particular, to identifying the visibility of targets in an environment from locations in the environment.

2. Background

The visibility of targets in an environment may be important when gathering information about the targets in the environment. This information may include, for example, an identification of measurements for a number of parameters, a detection of movement, a detection of a speed of travel, a detection of a heat signature, a detection of a radio signal, and/or other suitable information about a target. This information may be gathered using, for example, sensors.

The sensors may need to be able to detect the targets to generate information about the targets. Further, the sensors may need to be placed in locations in the environment that will allow the sensors to detect the targets. For example, sensors may be attached to unmanned aerial vehicles. These unmanned aerial vehicles may be flown to, placed at, or attached to different locations in the environment that allow the sensors to detect the targets.

Typically, a sensor is configured to generate information for a target when a line of sight from the sensor to the target is unblocked. A line of sight is unblocked when objects in the environment do not block the line of sight from the sensor to the target. A line of sight is blocked when objects in the environment and/or portions of the objects are present along the line of sight.

Identifying a location for the placement of a sensor requires identifying a location in an environment that allows the sensor to have an unblocked line of sight to the target. In other words, the target may need to be visible from the location in the environment at which the sensor is placed.

Therefore, it would be advantageous to have a method and apparatus which takes into account one or more of the issues discussed above, as well as possibly other issues.

SUMMARY

In one advantageous embodiment, a method is present for identifying visibility of targets. A first function is selected by a computer system in which the first function is configured to indicate whether locations in an environment are at a surface for a number of objects in the environment, in a first number of areas that are outside the surface for the number of objects in the environment, or in a second number of areas that are inside the surface for the number of objects in the environment. A first number of volumes are formed for the environment by the computer system. Each volume in the first number of volumes has a size selected such that a difference between a first number of interpolated values for each volume in the first number of volumes and a first number of values generated using the first function for each volume in the first number of volumes is within a first threshold. A second number of volumes is formed for the environment by the computer system. Each volume in the second number of volumes has a size selected such that a difference between a second number of interpolated values for each volume in the second number of volumes and a second number of values generated using a second function for each volume in the second number of volumes is within a second threshold. The second number of values generated using the second function is a number of minimum values along a number of lines from each volume in the second number of volumes to a target in the environment.

In another advantageous embodiment, a method is present for identifying visibility of targets. A signed distance function is selected by a computer system. The signed distance function is configured to generate values for locations in an environment. The values indicate whether the locations are at a surface for a number of objects in the environment, in a first number of areas that are outside the surface for the number of objects in the environment, or in a second number of areas that are inside the surface for the number of objects in the environment. Each value in the values indicates how close a location in the locations in the environment is to the surface for the number of objects. A first number of volumes is formed for the environment by the computer system using an adaptive distance field process. Each volume in the first number of volumes has a size selected such that a difference between a first number of interpolated values for each volume in the first number of volumes and a first number of values generated using the signed distance function for each volume in the first number of volumes is within a first threshold. A second number of volumes is formed for the environment by the computer system using the adaptive distance field process. Each volume in the second number of volumes has a size selected such that a difference between a second number of interpolated values for each volume in the second number of volumes and a second number of values generated using a visibility function for each volume in the second number of volumes is within a second threshold. The second number of values generated using the visibility function is a number of minimum values along a number of lines of sight from each volume in the second number of volumes to a target in the environment.

In yet another advantageous embodiment, an apparatus comprises a computer system. The computer system is configured to create a model for placing a number of sensors. The computer system is configured to select a first function that is configured to indicate whether locations in an environment are at a surface for a number of objects in the environment, in a first number of areas that are outside the surface for the number of objects in the environment, or in a second number of areas that are inside the surface for the number of objects in the environment. The computer system is configured to form a first number of volumes for the environment. Each volume in the first number of volumes has a size selected such that a difference between a first number of interpolated values for each volume in the first number of volumes and a first number of values generated using the first function for each volume in the first number of volumes is within a first threshold. The computer system is configured to form a second number of volumes for the environment. Each volume in the second number of volumes has a size selected such that a difference between a second number of interpolated values for each volume in the second number of volumes and a second number of values generated using a second function for each volume in the second number of volumes is within a second threshold. The second number of values generated using the second function is a number of minimum values along a number of lines from each volume in the second number of volumes to a target in the environment.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
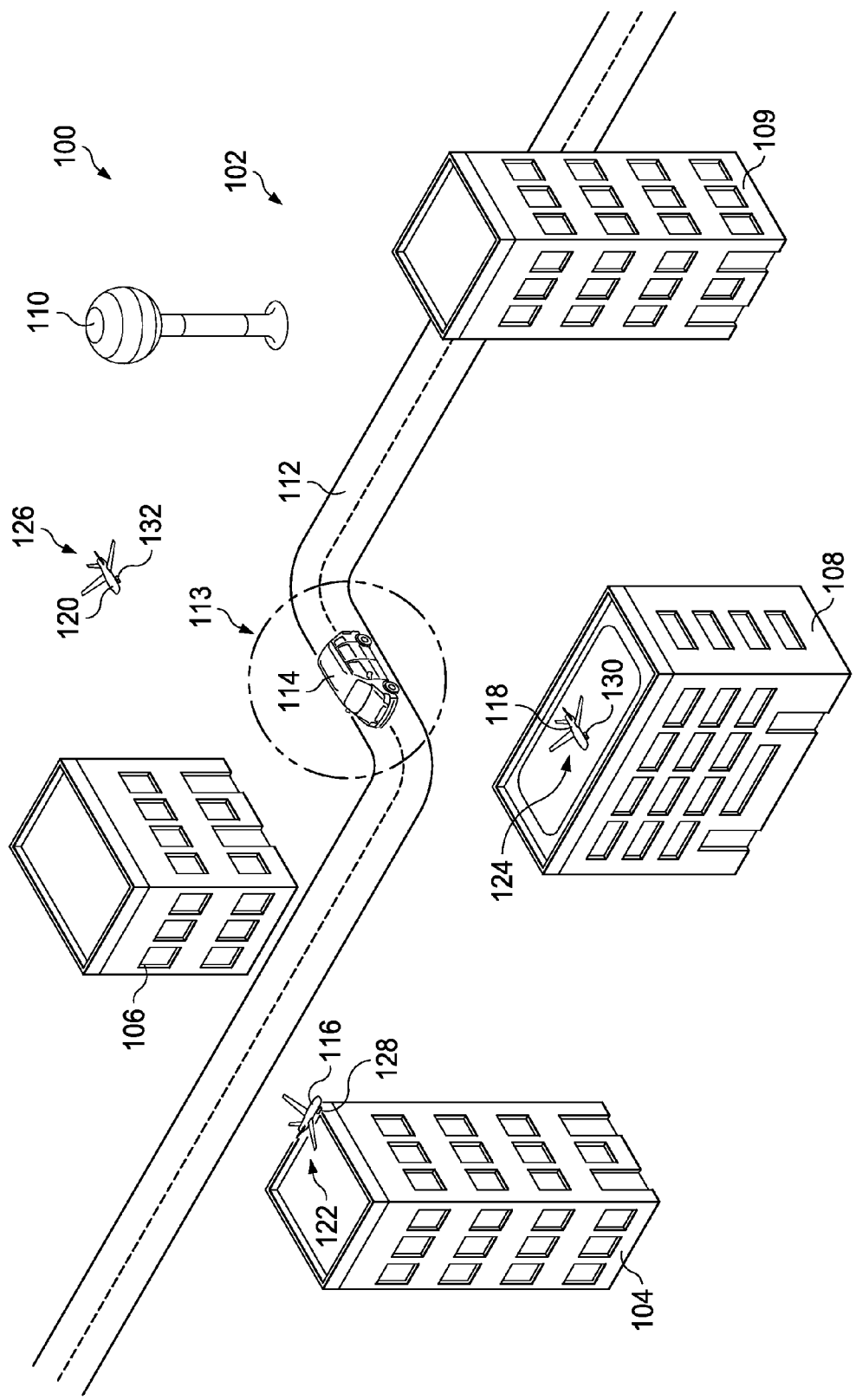
FIG. 1 is an illustration of an environment in accordance with an advantageous embodiment.

With reference now to FIG. 1, an illustration of an environment is depicted in accordance with an advantageous embodiment. In this illustrative example, environment 100 is an area in a city. As depicted, environment 100 includes number of objects 102. Number of objects 102 includes building 104, building 106, building 108, building 109, water tower 110, and roadway 112. In other illustrative examples, environment 100 may include other types of objects.

Environment 100 also includes vehicle 114, unmanned aerial vehicle 116, unmanned aerial vehicle 118, and unmanned aerial vehicle 120. As depicted, unmanned aerial vehicle 116 is at location 122 and is attached to building 104 in environment 100. Unmanned aerial vehicle 118 is at location 124 on top of building 108 in environment 100. Unmanned aerial vehicle 120 is at location 126 in the air in environment 100.

Unmanned aerial vehicles 116, 118, and 120 have sensors 128, 130, and 132, respectively. Sensors 128, 130, and 132 take the form of camera systems in this illustrative example. These camera systems are configured to generate images of target 113. Target 113, in this illustrative example, is a location on roadway 112. In particular, sensors 128, 130, and 132 are configured to generate images of target 113 when vehicle 114 is at target 113.

In this illustrative example, sensor 128 for unmanned aerial vehicle 116, sensor 130 for unmanned aerial vehicle 118, and sensor 132 for unmanned aerial vehicle 120 need to be able to detect target 113 and vehicle 114 at target 113 from location 122, location 124, and location 126, respectively. In other words, sensors 128, 130, and 132 may need to have visibility of target 113 from locations 122, 124, and 126, respectively, to be able to generate images for vehicle 114 at target 113.

In the different advantageous embodiments, the placement of unmanned aerial vehicle 116 with sensor 128, unmanned aerial vehicle 118 with sensor 130, and unmanned aerial vehicle 120 with sensor 132 in locations in environment 100 may be determined by the identification of the visibility of target 113 from different locations in environment 100.

The different advantageous embodiments recognize and take into account a number of different considerations. For example, the different advantageous embodiments recognize and take into account that currently available methods for identifying visibility of targets do not produce signed continuous visibility functions.

A signed continuous visibility function is a continuous function that indicates whether visibility from a given point is blocked, unblocked, or at a transition where the visibility changes between blocked and unblocked. Further, a signed continuous visibility function generates positive values where visibility is unblocked, negative values where visibility is blocked, and zero values at the transition where visibility changes between blocked and unblocked.

For example, binary visibility functions are typically used for geometric solutions for identifying visibility of targets. Binary visibility functions are not continuous functions and are not signed. Further, binary visibility functions may not be used with continuous optimization methods for identifying locations at which to place sensors.

Optimization methods are used to identify locations for the placement of sensors that meet a set of desired requirements. These requirements may include, for example, a desired height above ground, a desired distance away from the surface of an object, and/or other requirements. In some examples, the location may be selected such that movement of the sensor from the location by a distance of a selected amount does not affect the visibility of the target.

The different advantageous embodiments recognize and take into account that currently used methods for identifying visibility of objects may require a greater amount of time and effort than desired. Further, currently used methods for identifying visibility of objects may require a greater number of mathematical computations and processing than desired. The different advantageous embodiments recognize and take into account that it may be desirable to have a method for identifying visibility of targets in an environment in a more efficient way as compared to currently used methods.

Thus, the different advantageous embodiments provide a method, apparatus, and computer program product for identifying visibility of objects. In one advantageous embodiment, a method is present for identifying visibility of targets. A first function is selected by a computer system in which the first function is configured to indicate whether locations in an environment are at a surface for a number of objects in the environment, in a first number of areas that are outside the surface for the number of objects in the environment, or in a second number of areas that are inside the surface for the number of objects in the environment.

A first number of volumes is formed for the environment by the computer system. Each volume in the first number of volumes has a size selected such that a difference between a first number of interpolated values for each volume in the first number of volumes and a first number of values generated using the first function for each volume in the first number of volumes is within a first threshold.

A second number of volumes is formed for the environment by the computer system. Each volume in the second number of volumes has a size selected such that a difference between a second number of interpolated values for each volume in the second number of volumes and a second number of values generated using a second function for each volume in the second number of volumes is within a second threshold. The second number of values generated using the second function is a number of minimum values along a number of lines from each volume in the second number of volumes to a target in the environment.

Figure 2:
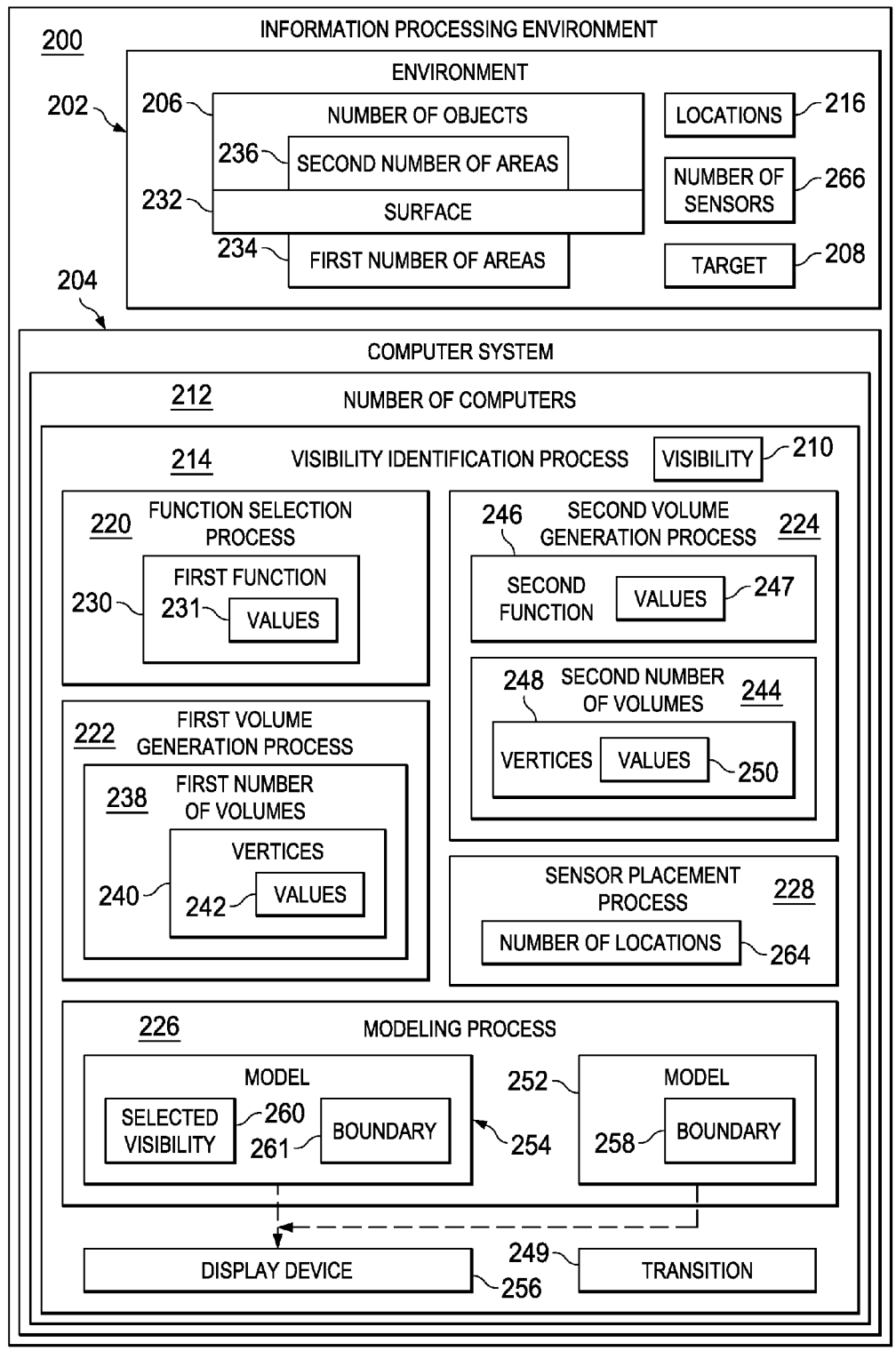
FIG. 2 is an illustration of an information processing environment in accordance with an advantageous embodiment.

With reference now to FIG. 2, an illustration of an information processing environment is depicted in accordance with an advantageous embodiment. In this illustrative example, information processing environment 200 includes environment 202 and computer system 204. Environment 100 in FIG. 1 is an example of one implementation for environment 202.

In this illustrative example, environment 202 may be a city, an area in a city, a field, a forest, a village, a pass in a mountain area, a geographic region, an area in a building, a lake, a portion of a lake, a portion of an ocean, or some other type of environment. Environment 202 includes number of objects 206. Number of objects 206 may include, for example, without limitation, mobile platforms, stationary platforms, buildings, bridges, structures, water towers, roadways, hills, mountains, trees, and/or other suitable types of objects.

Environment 202 may also include target 208. Target 208 may take the form of, for example, without limitation, a mobile platform, a stationary platform, a portion of a platform, a building, a portion of a building, a window, a door, an exhaust vent, a person, a vehicle, a location on a roadway, or some other type of target. In these illustrative examples, visibility 210 of target 208 in environment 202 may be identified using computer system 204.

Computer system 204 is comprised of number of computers 212. A number of, when referring to items, is one or more items. For example, a number of computers is one or more computers.

In this illustrative example, visibility identification process 214 may be run on computer system 204. Visibility identification process 214 is run to identify visibility 210 of target 208 in environment 202 from locations 216 in environment 202.

In this illustrative example, visibility identification process 214 includes function selection process 220, first volume generation process 222, second volume generation process 224, modeling process 226, and sensor placement process 228. In these examples, these processes within visibility identification process 214 are run on a single computer within number of computers 212 in computer system 204. In other examples, these processes may be run on multiple computers within number of computers 212 in computer system 204. Further, the processes within visibility identification process 214 may be run as program code on computer system 204.

Function selection process 220 selects first function 230. In these illustrative examples, first function 230 is a distance function. A distance function may be any function configured to provide distance information for locations 216 in environment 202 with respect to surface 232 of number of objects 206. In other words, first function 230 identifies how close any location in locations 216 in environment 202 is to surface 232 of number of objects 206.

In this illustrative example, surface 232 for number of objects 206 may include a number of surfaces for each of number of objects 206.

First function 230 is configured to generate values 231 for locations 216 in environment 202. Values 231 indicate whether locations 216 are at surface 232 for number of objects 206 in environment 202, in first number of areas 234 outside of surface 232, or in second number of areas 236 inside of surface 232. Values 231 may be zero for locations at surface 232, positive for locations in first number of areas 234 outside of surface 232, and negative for locations in second number of areas 236 inside of surface 232.

Further, values 231 also indicate distances between locations 216 in environment 202 and surface 232 for number of objects 206. These distances may be in units, such as, for example, without limitation, meters, inches, feet, centimeters, or some other suitable type of unit for measuring distance.

In this illustrative example, a zero value for values 231 indicates a distance of zero units between a location in locations 216 and surface 232. In other words, a zero value for values 231 indicates that the location is at surface 232. As a positive value in values 231 increases positively, the distance between the location in first number of areas 234 for which the positive value is generated and surface 232 increases. Similarly, as a negative value in values 231 increases negatively, the distance between the location in second number of areas 236 for which the negative values are generated and surface 232 increases.

In these illustrative examples, first volume generation process 222 forms first number of volumes 238 for environment 202 using first function 230. First number of volumes 238 may be, for example, a volumetric pixel, a cell, a cube, or some other suitable type of volume. First number of volumes 238 has vertices 240 with values 242. A vertex in vertices 240 is where edges of a volume in first number of volumes 238 meet. Vertices 240 represent a portion of locations in locations 216 in environment 202. Values 242 are a portion of values in values 231 generated using first function 230 for the portion of locations represented by vertices 240.

In this illustrative example, second volume generation process 224 forms second number of volumes 244 for environment 202 using second function 246. In some illustrative examples, second function 246 may be selected by function selection process 220. In other illustrative examples, second function 246 may be created by second volume generation process 224 or some other process in visibility identification process 214.

Second function 246 takes the form of a visibility function in these examples. A visibility function is any function configured to identify visibility 210 of target 208 from locations 216 in environment 202.

Second function 246 is configured to generate values 247 for locations 216 in environment 202. Values 247 indicate whether a line of sight from a location in locations 216 to target 208 is blocked or unblocked along the line of sight. A line of sight is a straight line segment from a particular location in locations 216 in environment 202 to target 208.

A line of sight is blocked when at least a portion of number of objects 206 intersects the line of sight. A line of sight is unblocked when no objects intersect the line of sight. In these illustrative examples, a line of sight intersects an object in number of objects 206 by touching a surface of the object or passing through the object.

Further, values 247 indicate whether the line of sight intersects transition 249. Transition 249 occurs where the line of sight changes between being blocked and unblocked. If a line of sight intersects transition 249, target 208 may not be visible along the line of sight.

A value in values 247 is zero when a line of sight from a location in locations 216 intersects transition 249. Further, the value in values 247 is positive when the line of sight is unblocked and negative when the line of sight is blocked. Further, the more positive or the more negative a value in values 247 is, the further away the location for which the value is generated is from having the line of sight from the location intersect transition 249.

In this illustrative example, second volume generation process 224 generates second number of volumes 244. Second number of volumes 244 has vertices 248 with values 250. Vertices 248 represent a portion of locations in locations 216 in environment 202. Values 250 are a portion of values 247 generated using second function 246 for the portion of locations represented by vertices 248.

Modeling process 226 is configured to generate model 252 using first number of volumes 238 and model 254 using second number of volumes 244. Modeling process 226 is also configured to display model 252 and model 254 on display device 256 in computer system 204.

Modeling process 226 uses model 252 to present a geometric representation of number of objects 206 in environment 202. Model 252 may be referred to as, for example, an object field. Further, modeling process 226 uses model 252 to present boundary 258 for number of objects 206 in environment 202. Boundary 258 is selected from one of surface 232 for number of objects 206 and a distance away from surface 232. When boundary 258 is surface 232 for number of objects 206, modeling process 226 uses model 252 to present a view of surface 232 of number of objects 206 in environment 202.

Model 254 is a model of visibility 210 of target 208 from locations 216 in environment 202. Model 254 may be referred to as, for example, a visibility field. In particular, modeling process 226 may use model 254 to indicate selected visibility 260 of target 208. Selected visibility 260 has a value indicating how close selected visibility 260 is to the transition where visibility 210 of target 208 changes between blocked and unblocked.

For example, modeling process 226 uses model 254 to present selected visibility 260 as boundary 261. When selected visibility 260 has a value of zero, target 208 may be visible from locations outside boundary 261 and not visible from locations inside boundary 261 in model 254.

Model 252 and model 254 may be displayed on display device 256 at the same time. Model 252 is displayed to present a view of surface 232 of number of objects 206. Model 254 is displayed with model 252 to present boundary 261 for selected visibility 260 with respect to number of objects 206 in environment 202.

In this illustrative example, sensor placement process 228 is configured to identify number of locations 264 in environment 202 for placing number of sensors 266. In these illustrative examples, sensor placement process 228 may use model 254 and model 252 to identify number of locations 264 for number of sensors 266.

Number of sensors 266 is configured to generate information about target 208. This information may include, for example, images, video, audio, measurements for a number of parameters for target 208, and/or other suitable information. Number of sensors 266 may include, for example, without limitation, camera systems, video cameras, heat sensors, light detectors, radar detectors, and/or other suitable types of sensors.

The illustration of information processing environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, visibility 210 of additional targets in addition to target 208 may be identified by computer system 204. In some illustrative examples, number of sensors 266 may include one set of sensors for generating information about one target and another set of sensors for generating information about another target.

As one illustrative example, when two targets are present in environment 202, visibility identification process 214 may identify visibility 210 for each of the targets separately. After identifying visibility 210 for each of the targets separately, modeling process 226 may combine model 254 for each of the targets to form a model of visibility for both of the targets. In other illustrative examples, visibility identification process 214 may identify visibility 210 for both targets at the same time. In this manner, model 254 may be generated for both targets at the same time.

Figure 3:
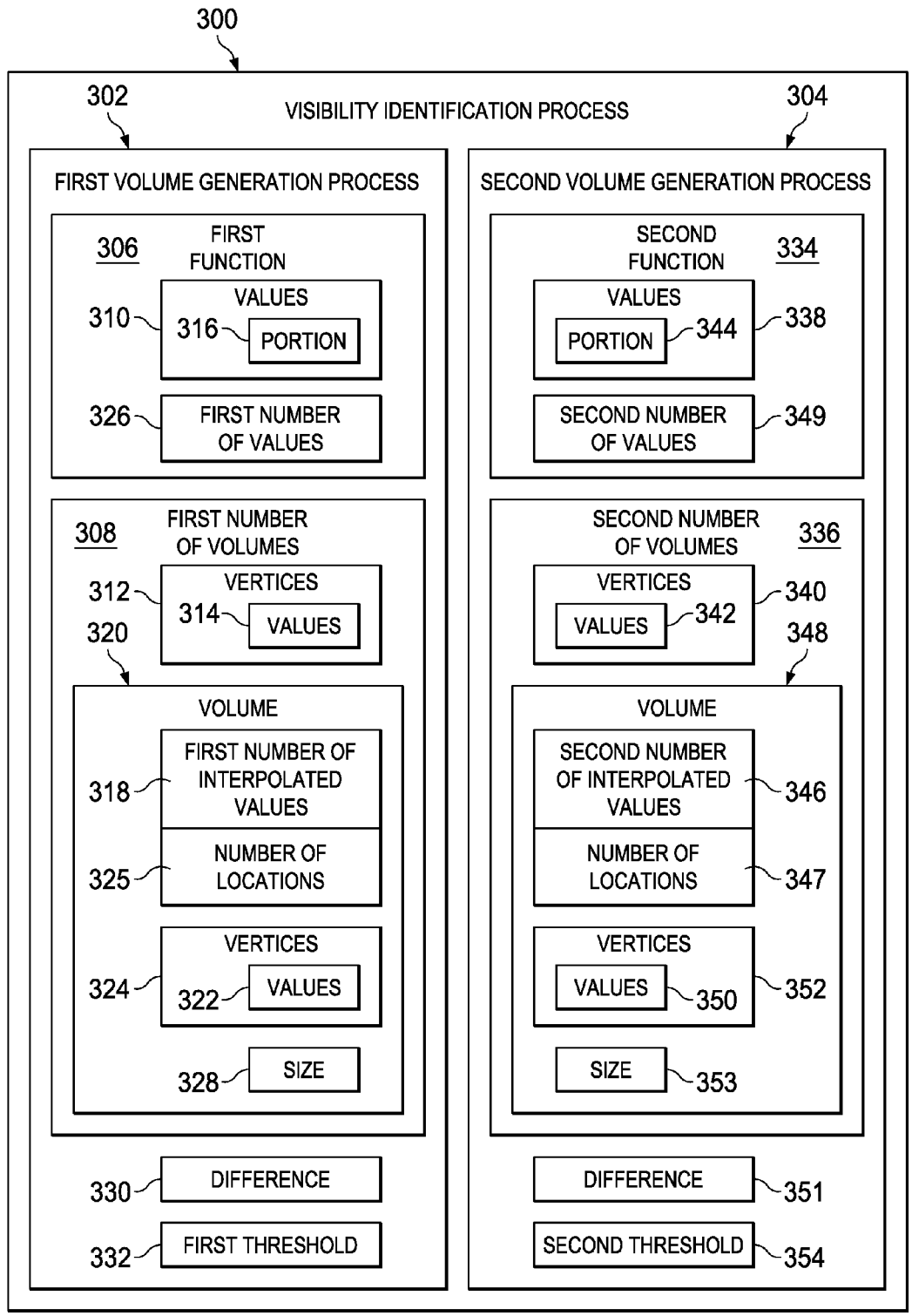
FIG. 3 is an illustration of processes in a visibility identification process in accordance with an advantageous embodiment.

With reference now to FIG. 3, an illustration of processes in a visibility identification process is depicted in accordance with an advantageous embodiment. In this illustrative example, visibility identification process 300 is an example of one implementation for visibility identification process 214 in FIG. 2.

Further, in this depicted example, first volume generation process 302 and second volume generation process 304 are more detailed examples of implementations of first volume generation process 222 and second volume generation process 224 in FIG. 2, respectively.

In this illustrative example, first volume generation process 302 uses first function 306 to form first number of volumes 308. First function 306 may be selected by a function selection process, such as function selection process 220 in FIG. 2. First function 306 is a distance function in this illustrative example. More specifically, first function 306 is a signed distance function in this depicted example.

A signed distance function is configured to generate values 310 that indicate how close a given location is to a boundary. The boundary, in these examples, is the surface for a number of objects in an environment, such as surface 232 of number of objects 206 in environment 202 in FIG. 2.

Values 310 generated by the signed distance function are positive outside the boundary, negative inside the boundary, and zero at the boundary. In other words, first function 306 generates values 310 that are positive outside the surface of a number of objects, negative inside the surface of a number of objects, and zero at the surface of a number of objects.

In these illustrative examples, first function 306 is a signed distance function of a set S in a metric space, where S is for the number of objects. The metric space is an ordered pair (X, d), where X is a set, R is the set of real numbers, and d is:

$$d: X \times X \to R$$

such that for any x, y, and z in X, $$d(x,y)=0, \text{ if and only if } x=y, \text{ and}$$

$$d(x,z) \leq d(x,y)+d(z,y).$$

First function 306 is:

$$f(x) = \begin{cases} d(x, S^c) & \text{if } x \in S \\ -d(x, S) & \text{if } x \in S^c, \text{ where} \end{cases}$$

$$d(x, S) = \inf_{y \in S} d(x, y),$$

where inf denotes infimum, and C denotes a complement such that $S^C$ is the complement of set S.

First volume generation process 302 forms first number of volumes 308 using first function 306 such that vertices 312 of first number of volumes 308 have values 314 that are a portion of values 310. Vertices 312 in first number of volumes 308 correspond to a portion of the locations in an environment.

Values 314 for vertices 312 correspond to portion 316 of values 310 generated by first function 306. Portion 316 of values 310 is the values generated by first function 306 for the portion of the locations in the environment corresponding to vertices 312.

In this illustrative example, first volume generation process 302 identifies interpolated values for each volume in first number of volumes 308. For example, first volume generation process 302 identifies first number of interpolated values 318 for volume 320 in first number of volumes 308. First number of interpolated values 318 is identified using values 322 for vertices 324 of volume 320.

An interpolated value, in this example, is a value that is approximated for a location when an exact value for that location is not known. For example, first number of interpolated values 318 is identified by estimating values for first function 306 for number of locations 325 in volume 320 based on weights given to each of vertices 324 of volume 320 having values 322.

In this illustrative example, first volume generation process 302 selects the size of each volume in first number of volumes 308. For example, first number of values 326 is generated by first function 306 for number of locations 325. First volume generation process 302 selects size 328 of volume 320 such that difference 330 between first number of interpolated values 318 for number of locations 325 in volume 320 and first number of values 326 for number of locations 325 in volume 320 is within first threshold 332.

In this manner, the number of sizes for first number of volumes 308 is selected such that differences between interpolated values for first number of volumes 308 and values generated by first function 306 are within first threshold 332.

In this illustrative example, second volume generation process 304 uses second function 334 to generate second number of volumes 336. Second function 334 is a visibility function in this illustrative example. Second function 334 generates values 338 that indicate a visibility of targets from locations in an environment. Values 338 are positive when visibility is not blocked, negative when visibility is blocked, and zero at a transition where the visibility changes between blocked and unblocked.

Second volume generation process 304 forms second number of volumes 336 using second function 334 such that vertices 340 of second number of volumes 336 have values 342 that are a portion of values 338. Vertices 340 in second number of volumes 336 correspond to a portion of the locations in an environment.

Values 342 for vertices 340 correspond to portion 344 of values 338 generated by second function 334. Portion 344 of values 338 is the values generated by second function 334 for the portion of the locations in the environment corresponding to vertices 340.

In this illustrative example, second volume generation process 304 identifies interpolated values for each volume in second number of volumes 336. For example, second volume generation process 304 identifies second number of interpolated values 346 for volume 348 in second number of volumes 336. Volume 348 has vertices 352 having values 350. Second number of interpolated values 346 is identified by estimating values for second function 334 for number of locations 347 in volume 348 based on weights given to each of vertices 352 in volume 348 having values 350.

Second volume generation process 304 selects the sizes for second number of volumes 336 in a manner similar to the manner in which first volume generation process 302 selects the sizes for first number of volumes 308. For example, second number of values 349 is generated by second function 334 for number of locations 347 in volume 348. Second volume generation process 304 selects size 353 of volume 348 such that difference 351 between second number of interpolated values 346 for number of locations 347 in volume 348 and second number of values 349 for number of locations 347 in volume 348 is within second threshold 354.

The number of sizes for second number of volumes 336 is selected such that differences between interpolated values for locations in second number of volumes 336 and values generated by second function 334 for the same locations in second number of volumes 336 are within second threshold 354.

Figure 4:
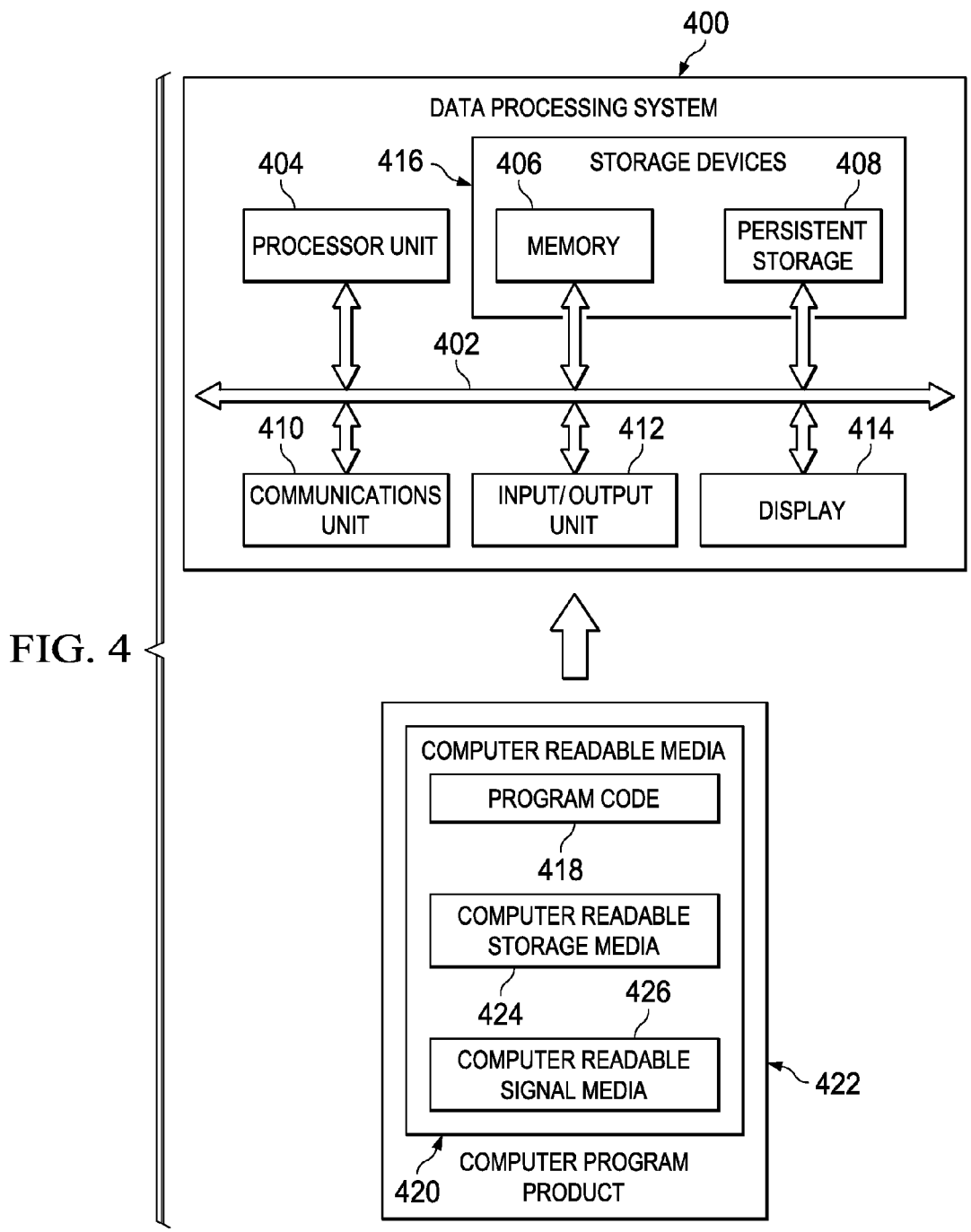
FIG. 4 is an illustration of a data processing system in accordance with an advantageous embodiment.

Turning now to FIG. 4, an illustration of a data processing system is depicted in accordance with an advantageous embodiment. In this illustrative example, data processing system 400 may be used to implement one or more of number of computers 212 in computer system 204 in FIG. 2. As depicted, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404.

Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these illustrative examples, computer readable storage media 424 is a non-transitory computer readable storage medium.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a bus system or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache such as found in an interface and memory controller hub that may be present in communications fabric 402.

Figure 5:
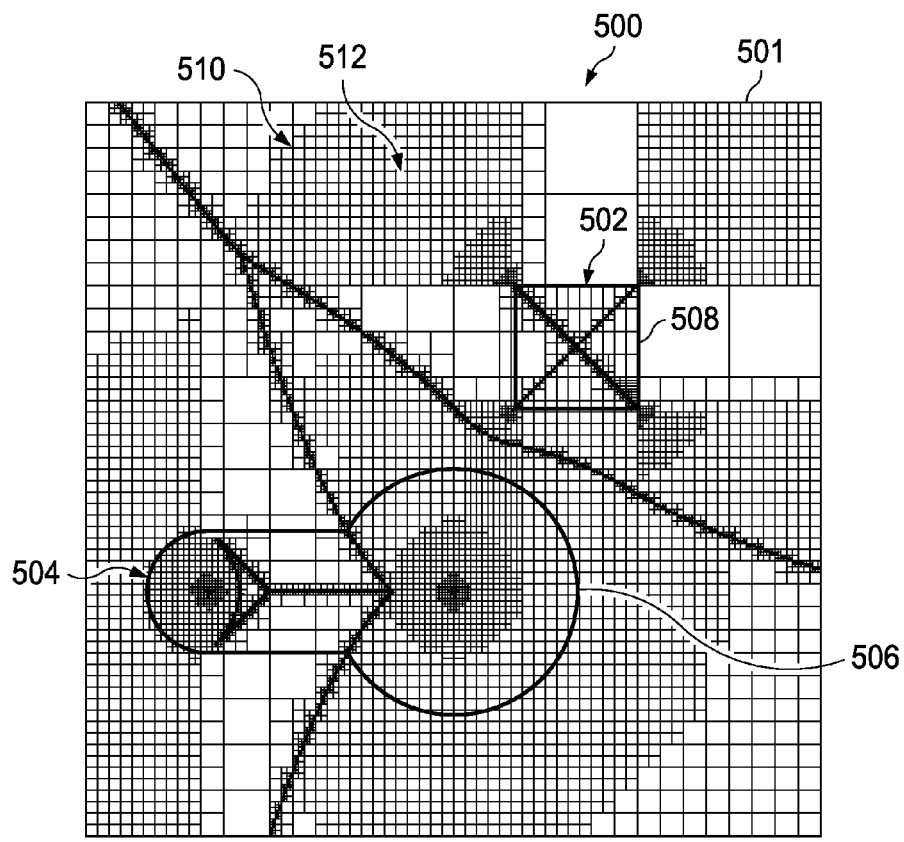
FIG. 5 is an illustration of a model in accordance with an advantageous embodiment.

With reference now to FIG. 5, an illustration of a model is depicted in accordance with an advantageous embodiment. In this illustrative example, model 500 is an example of one implementation for model 252 in FIG. 2. A modeling process, such as modeling process 226 in FIG. 2, may display model 500 on a display device, such as display device 256 in FIG. 2.

In this illustrative example, model 500 is referred to as an object field. Model 500 may also be referred to as an occluder field. In this depicted example, model 500 is a model of number of objects 504 in environment 501. In particular, model 500 presents a view of boundary 502 for number of objects 504 in environment 501. As depicted, environment 501 is viewed from a top view in this illustrative example.

Boundary 502 is a surface for number of objects 504. The surface may include a number of surfaces for each of number of objects 504. Further, each of the number of surfaces is a closed boundary surface in this illustrative example. Number of objects 504 includes object 506 and object 508 in this illustrative example.

Model 500 also includes first number of volumes 510. First number of volumes 510 takes the form of cells 512. Cells 512 take the form of cubes in these examples. As depicted, cells 512 are seen as squares for the faces of these cubes from the top view of environment 501. Each vertex of cells 512 may have a value generated using a function, such as first function 230 in FIG. 2 and/or first function 306 in FIG. 3.

Figure 6:
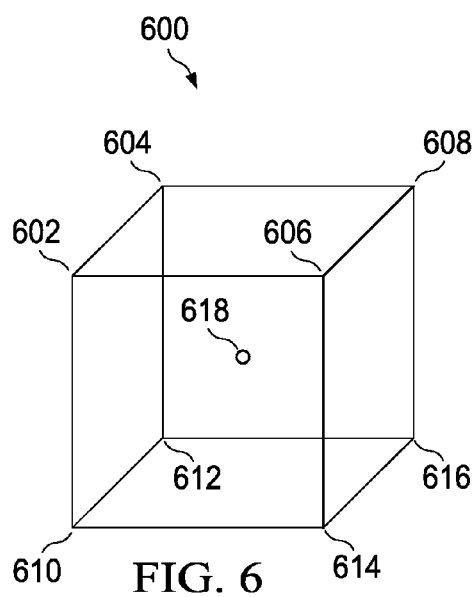
FIG. 6 is an illustration of a volume generated by a volume generation process in accordance with an advantageous embodiment.

With reference now to FIG. 6, an illustration of a volume generated by a volume generation process is depicted in accordance with an advantageous embodiment. In this illustrative example, volume 600 is an example of a volume in first number of volumes 238 in FIG. 2, second number of volumes 244 in FIG. 2, first number of volumes 308 in FIG. 3, and/or second number of volumes 336 in FIG. 3. Further, volume 600 is an example of a volume in first number of volumes 510 shown in a perspective view.

Further, volume 600 is an example of a volume that may be generated by, for example, first volume generation process 222 in FIG. 2, second volume generation process 224 in FIG. 2, first volume generation process 302 in FIG. 3, and/or second volume generation process 304 in FIG. 3.

Volume 600 has vertices 602, 604, 606, 608, 610, 612, 614, and 616. In this illustrative example, vertices 602, 604, 606, 608, 610, 612, 614, and 616 have values generated by using a function, such as first function 230 in FIG. 2 and/or first function 306 in FIG. 3.

Using the values for vertices 602, 604, 606, 608, 610, 612, 614, and 616, a number of interpolated values may be generated for volume 600. For example, an interpolated value may be generated for location 618 in volume 600.

Given location 618, the interpolated value may be generated using:

$$h_c(p) = \sum_{i \in \{0,\ldots,7\}} w_i h_i$$

where p is the coordinate location for location 618; where $(w_0, \ldots, w_7)$ are the barycentric coordinates of p with respect to $Q_c$; where $Q_c = \{q_0, \ldots, q_7\}$ are vertices 602, 604, 606, 608, 610, 612, 614, and 616 of c and the values of h at those vertices; and where c is volume 600. In this example, $h_c$ is defined only inside c.

Volume 600, c, may be mapped to the unit cube $[0,1]^3$ by defining a normalized coordinate system where the vertices of volume 600 have the following coordinates:

$$q_0 = (0, 0, 0) \quad q_4 = (0, 0, 1)$$
$$q_1 = (1, 0, 0) \quad q_5 = (1, 0, 1)$$
$$q_2 = (1, 1, 0) \quad q_6 = (1, 1, 1)$$
$$q_3 = (0, 1, 0) \quad q_7 = (0, 1, 1)$$

Let (x, y, z) be the normalized coordinates of p in c. The formulae for the barycentric coordinates are:

$$w_0 = 1 + xy + yz + xz - (xyz + x + y + z) \quad w_4 = xyz + z - (xz + yz)$$
$$w_1 = xyz + x - (xy + xz) \quad w_5 = xz - xyz$$
$$w_2 = xy - xyz \quad w_6 = xyz$$
$$w_3 = xyz + y - (xy + yz) \quad w_7 = yz - xyz$$

with $$\sum_{i \in \{0,\ldots,7\}} w_i = 1.$$

The volume generation process compares the interpolated value generated at location 618 for volume 600 to a value generated by the first function at location 618. If the difference between the interpolated value and the value generated by the first function is greater than a threshold, the volume generation process divides volume 600 into smaller volumes. In this illustrative example, volume 600 is divided into eight volumes having substantially the same size. This division is shown in FIG. 7 below.

In this manner, the volume generation process may only divide volume 600 as needed based on the threshold. This method of dividing volumes may reduce the amount of time and/or processing power needed for generating a model of using volumes to present a view of a surface of a number of objects in an environment. Further, this method of dividing volume may be part of an adaptive distance field process.

Figure 7:
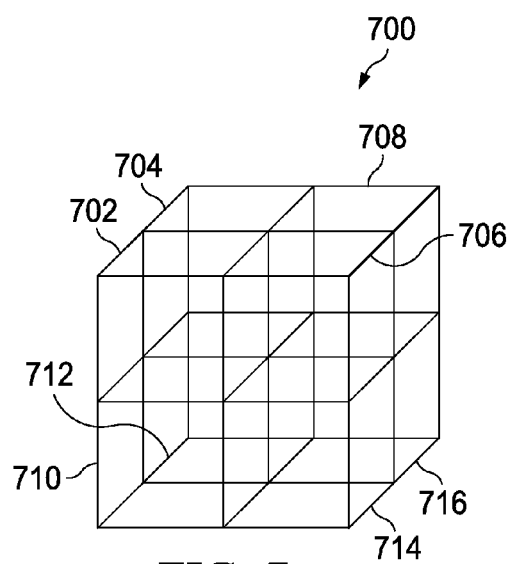
FIG. 7 is an illustration of volumes generated by a volume generation process in accordance with an advantageous embodiment.

With reference now to FIG. 7, an illustration of volumes generated by a volume generation process is depicted in accordance with an advantageous embodiment. In this illustrative example, volumes 700 are examples of volumes that may be generated by, for example, first volume generation process 222 in FIG. 2, second volume generation process 224 in FIG. 2, first volume generation process 302 in FIG. 3, and/or second volume generation process 304 in FIG. 3. Further, volumes 700 may be examples of volumes in first number of volumes 510 in FIG. 5.

Further, volumes 700 may be the results of dividing volume 600 in FIG. 6 into smaller volumes. Volumes 700 include volumes 702, 704, 706, 708, 710, 712, 714, and 716. In this illustrative example, volumes 702, 704, 706, 708, 710, 712, 714, and 716 each have substantially the same size.

Figure 8:
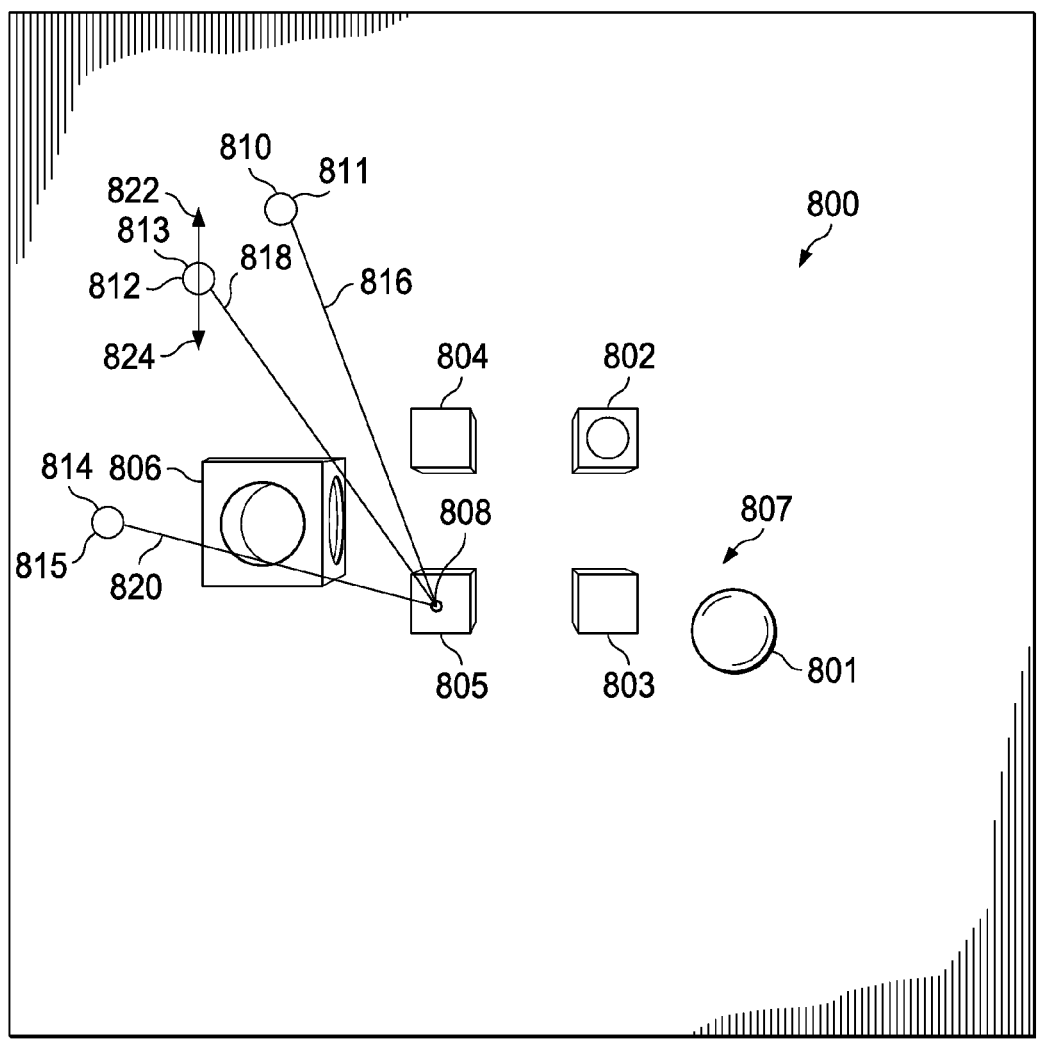
FIG. 8 is an illustration of a top view of an environment in accordance with an advantageous embodiment.

With reference now to FIG. 8, an illustration of a top view of an environment is depicted in accordance with an advantageous embodiment. In this illustrative example, environment 800 is an example of one implementation for environment 202 in FIG. 2. As depicted, environment 800 includes object 801, object 802, object 803, object 804, object 805, object 806, target 808, sensor 810, sensor 812, and sensor 814. Object 801, object 802, object 803, object 804, object 805, and object 806 form number of objects 807.

In this illustrative example, sensor 810 is at location 811 in environment 800, sensor 812 is at location 813 in environment 800, and sensor 814 is at location 815 in environment 800. Sensor 810 has line of sight 816 from location 811 to target 808. Sensor 812 has line of sight 818 from location 813 to target 808. Sensor 814 has line of sight 820 from location 815 to target 808.

As depicted, line of sight 816 is unblocked. In other words, no objects intersect line of sight 816. Line of sight 820 is blocked by object 806. Line of sight 818 intersects a transition between where the line of sight changes from being blocked to unblocked. Sensor 812 is not able to detect target 808 at location 813 of sensor 812.

If location 813 of sensor 812 is moved in the direction of arrow 822 by any distance, line of sight 818 becomes unblocked. However, if location 813 of sensor 812 is moved in the direction of arrow 824 by any distance, line of sight 818 is blocked.

A second function, such as second function 246 in FIG. 2 and/or second function 334 in FIG. 3, generates values for locations of the sensors. These values are minimum values identified from values generated using a first function, such as first function 230 in FIG. 2 and/or first function 306 in FIG. 3, along the different lines of sight for the locations. For example, the second function generates a positive value when sensor 810 is at location 811. This positive value is for a minimum value of a distance between the surface for object 804 and line of sight 816.

The second function generates a zero value when sensor 812 is at location 813. This zero value is for a minimum value of a distance between the surface for object 804 and object 806 and line of sight 818. The second function generates a negative value when sensor 814 is at location 815 of sensor 814. This negative value is for a minimum value of a distance between the surface for object 806 and line of sight 820. In this example, the minimum value is the most negative value along line of sight 820.

Figure 9:
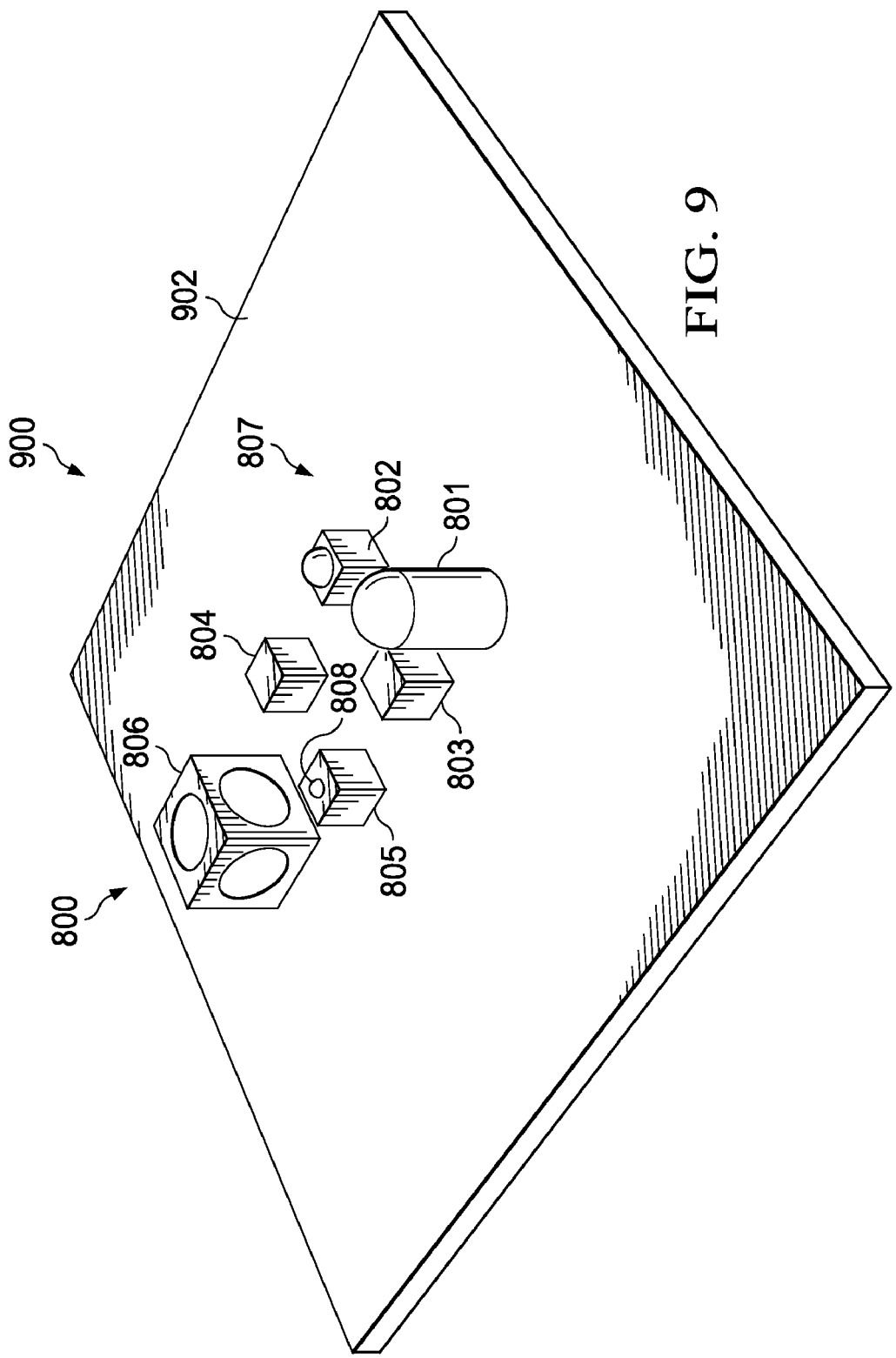
FIG. 9 is an illustration of a perspective view of a model of a number of objects in an environment in accordance with an advantageous embodiment.

With reference now to FIG. 9, an illustration of a perspective view of a model of a number of objects in an environment is depicted in accordance with an advantageous embodiment. In this illustrative example, model 900 is an example of one implementation for model 252 in FIG. 2. Further, model 900 may be generated using, for example, modeling process 226 in FIG. 2.

As depicted, model 900 is a model of number of objects 807 in environment 800 in FIG. 8. Model 900 also includes target 808 in environment 800. Further, model 900 presents boundary 902 for number of objects 807. Boundary 902 is the surface for number of objects 807.

Figure 10:
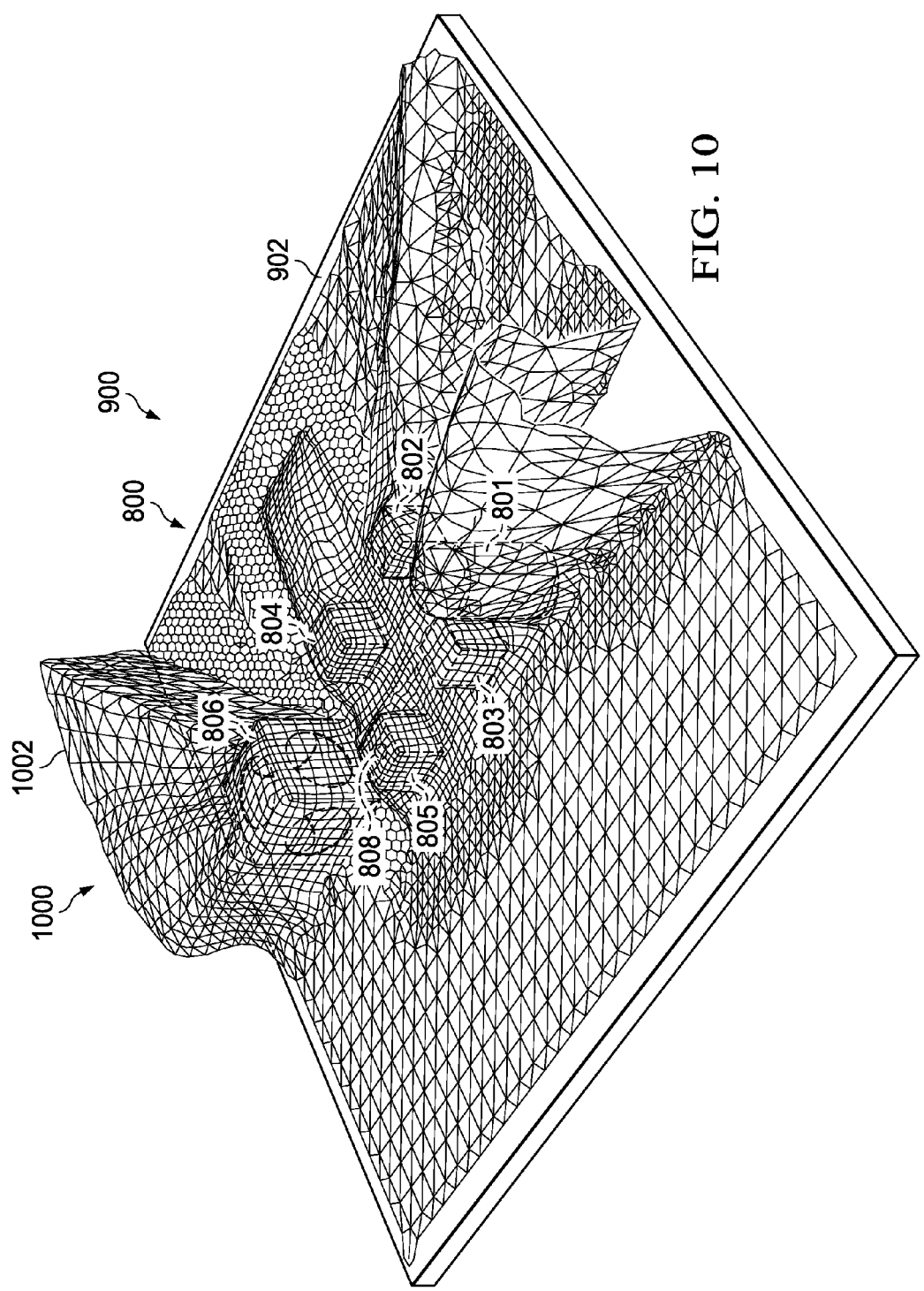
FIG. 10 is an illustration of a perspective view of two models in accordance with an advantageous embodiment.

With reference now to FIG. 10, an illustration of a perspective view of two models is depicted in accordance with an advantageous embodiment. In this illustrative example, model 900 in FIG. 9 and model 1000 are shown together. Model 1000 is an example of model 254 in FIG. 2. Further, model 1000 may be generated using, for example, modeling process 226 in FIG. 2.

In this illustrative example, model 1000 is a model of visibility. Model 1000 presents boundary 1002. Boundary 1002 is for a selected visibility, such as selected visibility 260 in FIG. 2. As depicted, boundary 1002 takes the form of a mesh. The mesh is formed by using line segments to connect the locations in the environment that have the selected visibility.

In this depicted example, the selected visibility is zero such that boundary 1002 is at the transition between where visibility changes from being blocked to unblocked. In other words, target 808 may not be visible in areas inside boundary 1002 in model 1000. However, target 808 may be visible in areas outside boundary 1002 in model 1000.

Figure 11:
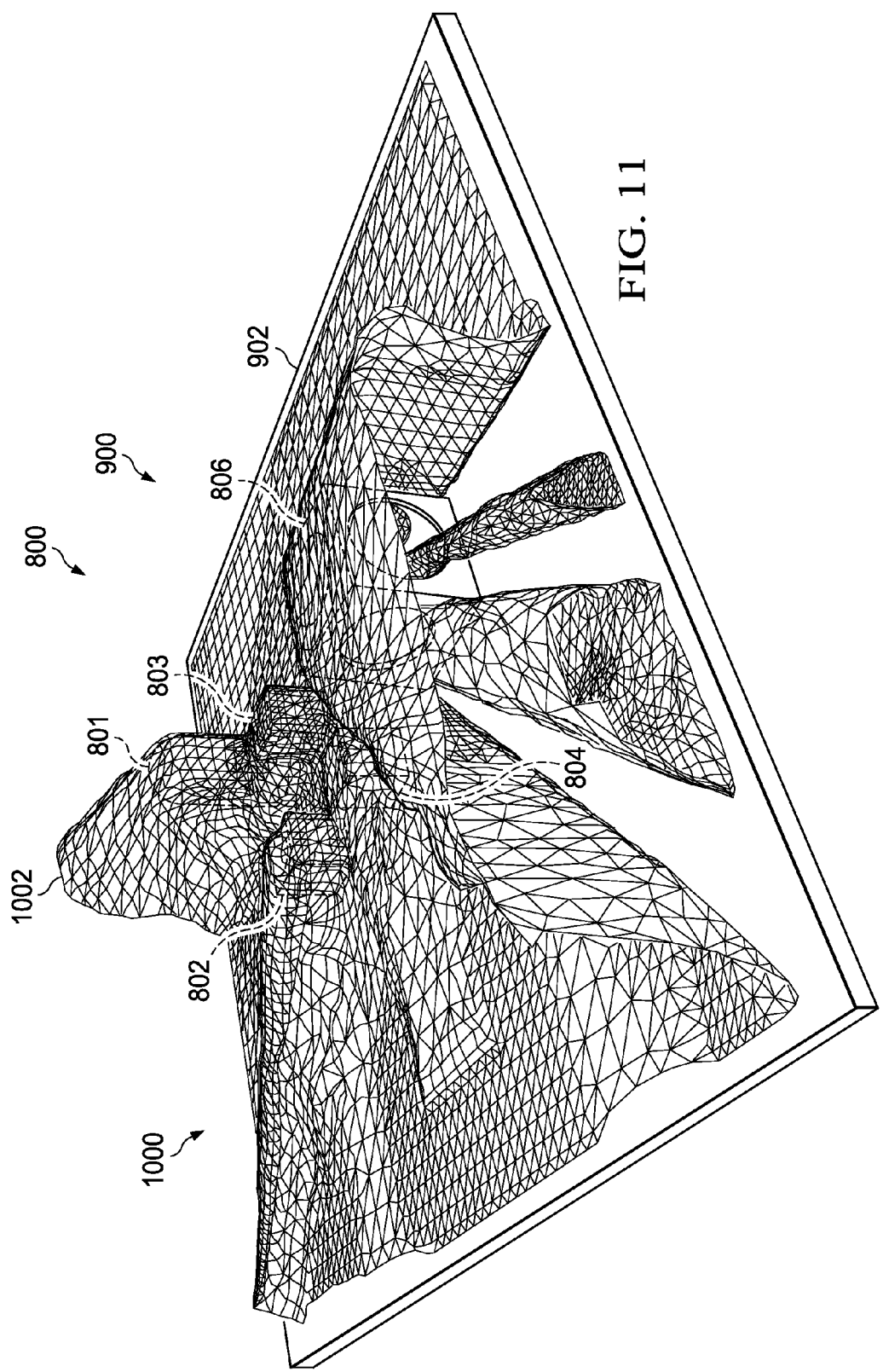
FIG. 11 is an illustration of another perspective view of two models in accordance with an advantageous embodiment.

With reference now to FIG. 11, an illustration of another perspective view of two models is depicted in accordance with an advantageous embodiment. In this illustrative example, both model 900 and model 1000 are seen from a different perspective view than as seen in FIG. 10.

Figure 12:
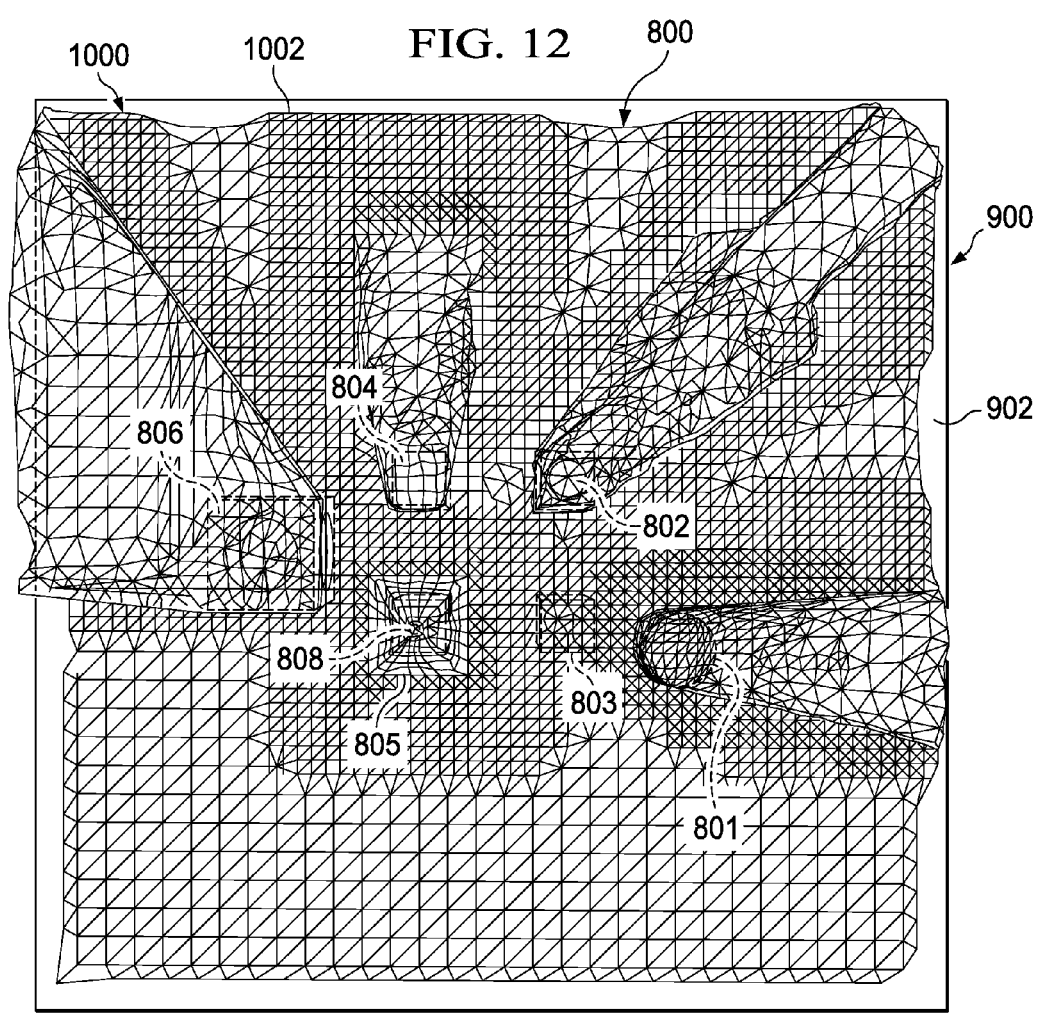
FIG. 12 is an illustration of a top view of two models in accordance with an advantageous embodiment.

With reference now to FIG. 12, an illustration of a top view of two models is depicted in accordance with an advantageous embodiment. In this illustrative example, model 900 and model 1000 are shown for a top view of environment 800.

Figure 13:
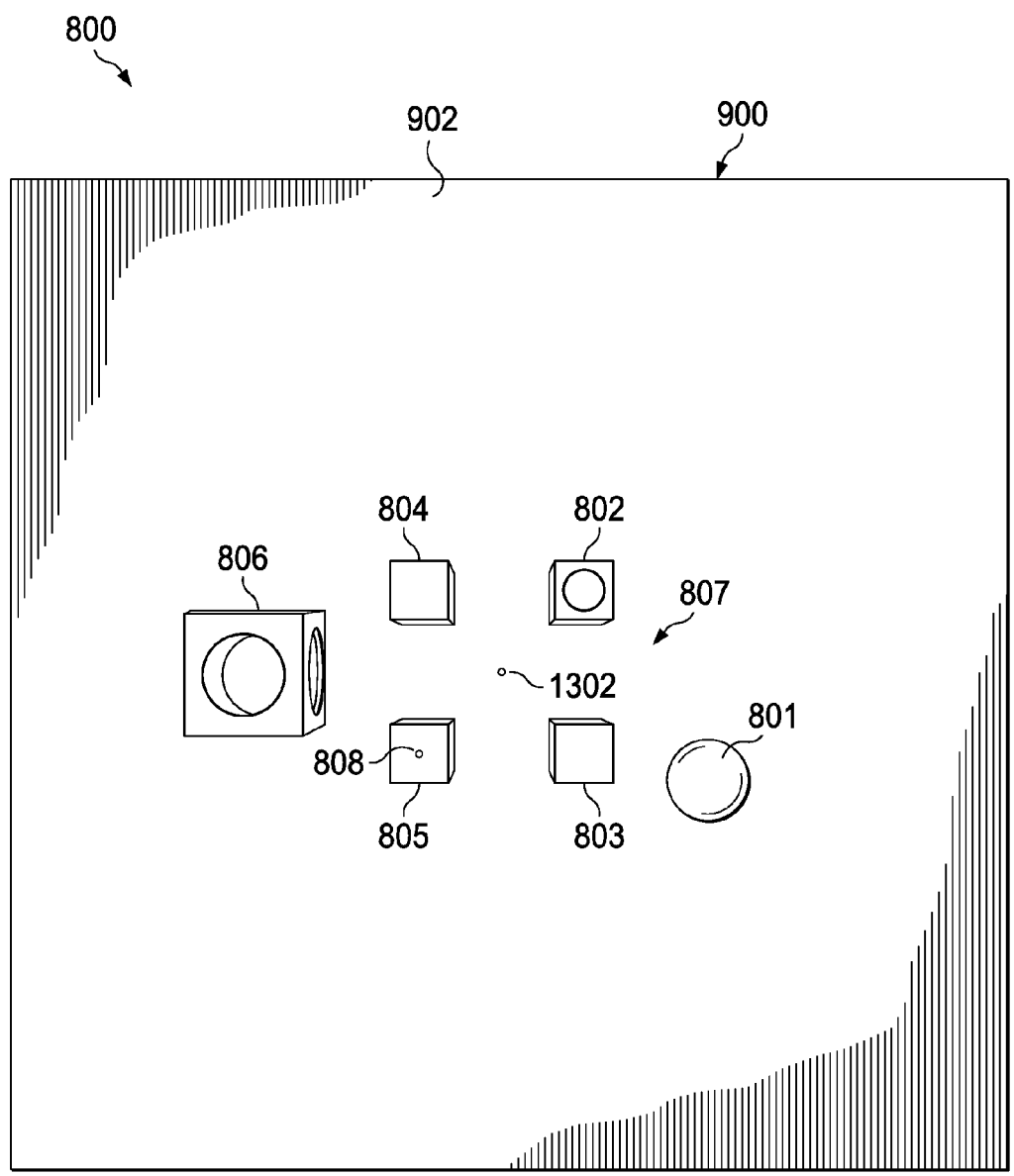
FIG. 13 is an illustration of a top view of a model of a number of objects in an environment in accordance with an advantageous embodiment.

With reference now to FIG. 13, an illustration of a top view of a model of a number of objects in an environment is depicted in accordance with an advantageous embodiment. In this illustrative example, model 900 for number of objects 807 in environment 800 is seen with target 1302 in addition to target 808.

Figure 14:
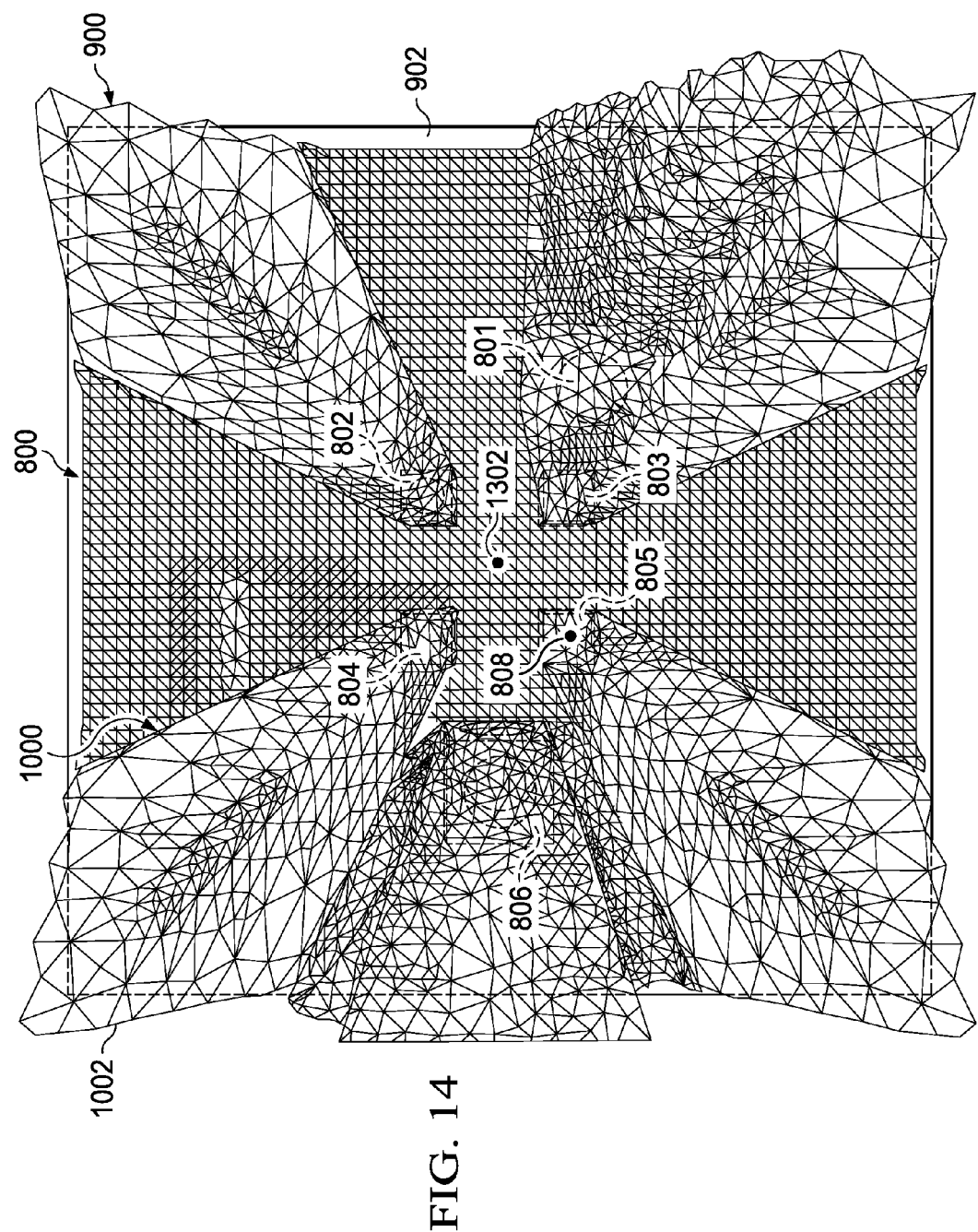
FIG. 14 is an illustration of a top view of two models in accordance with an advantageous embodiment.

With reference now to FIG. 14, an illustration of a top view of two models is depicted in accordance with an advantageous embodiment. In this illustrative example, model 900 and model 1000 are seen together. Model 1000 presents boundary 1002 for a selected visibility for both target 808 and target 1302.

Figure 15:
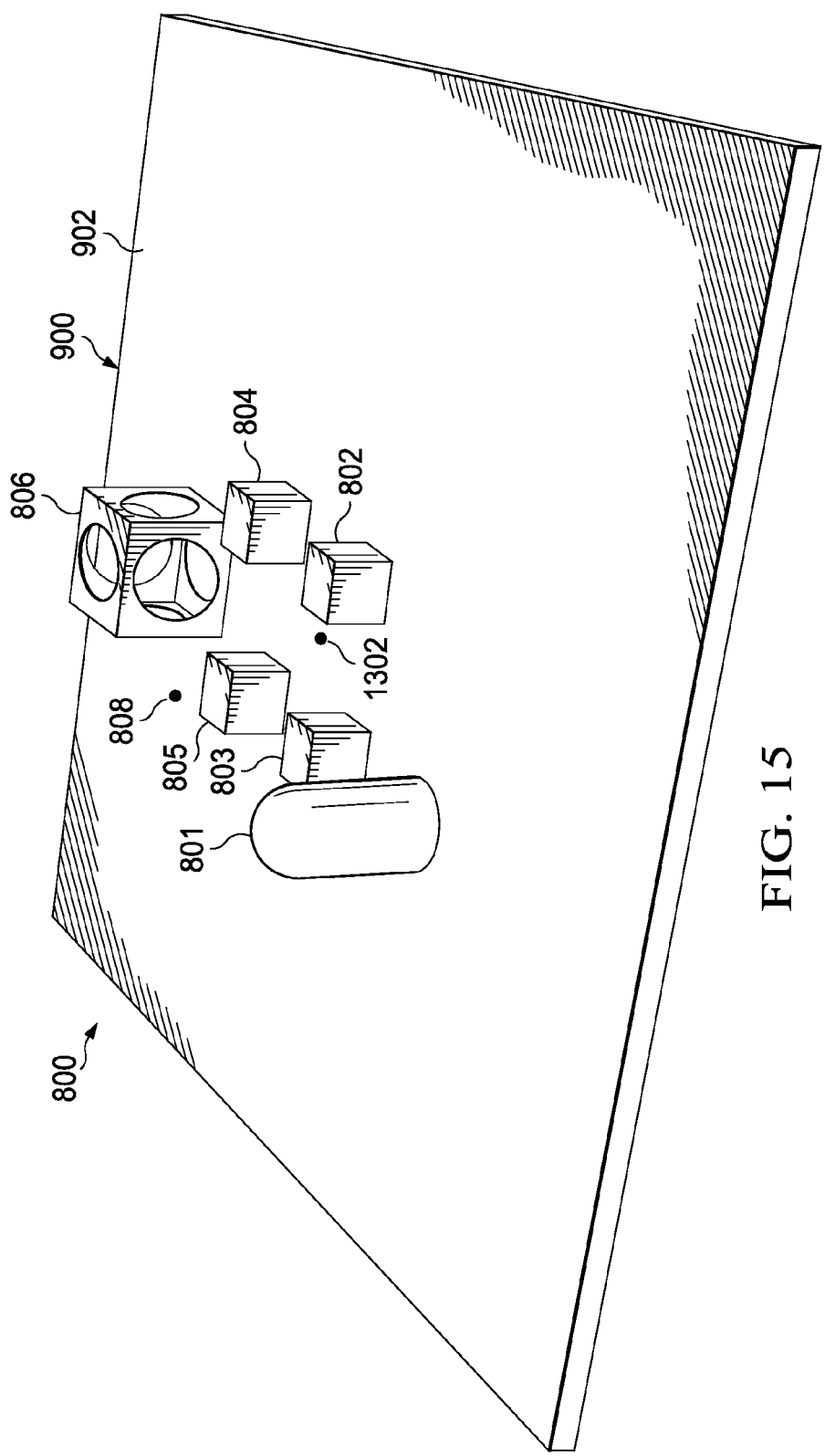
FIG. 15 is an illustration of a perspective view of a model of a number of objects in an environment in accordance with an advantageous embodiment.

With reference now to FIG. 15, an illustration of a perspective view of a model of a number of objects in an environment is depicted in accordance with an advantageous embodiment. In this illustrative example, model 900 is seen with target 1302 and target 808.

Figure 16:
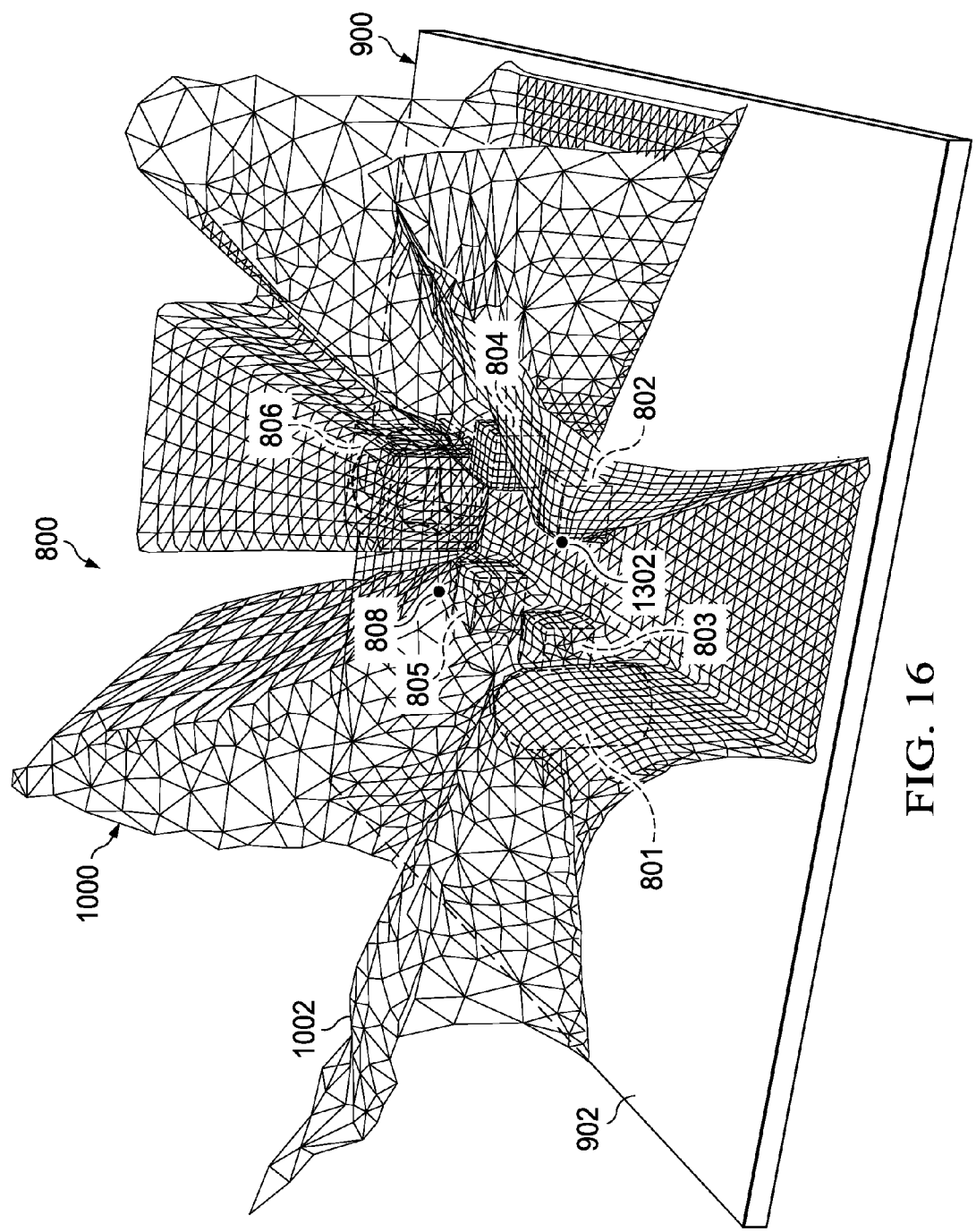
FIG. 16 is an illustration of a perspective view of two models in accordance with an advantageous embodiment.

With reference now to FIG. 16, an illustration of a perspective view of two models is depicted in accordance with an advantageous embodiment. In this illustrative example, model 900 and model 1000 are seen together.

Figure 17:
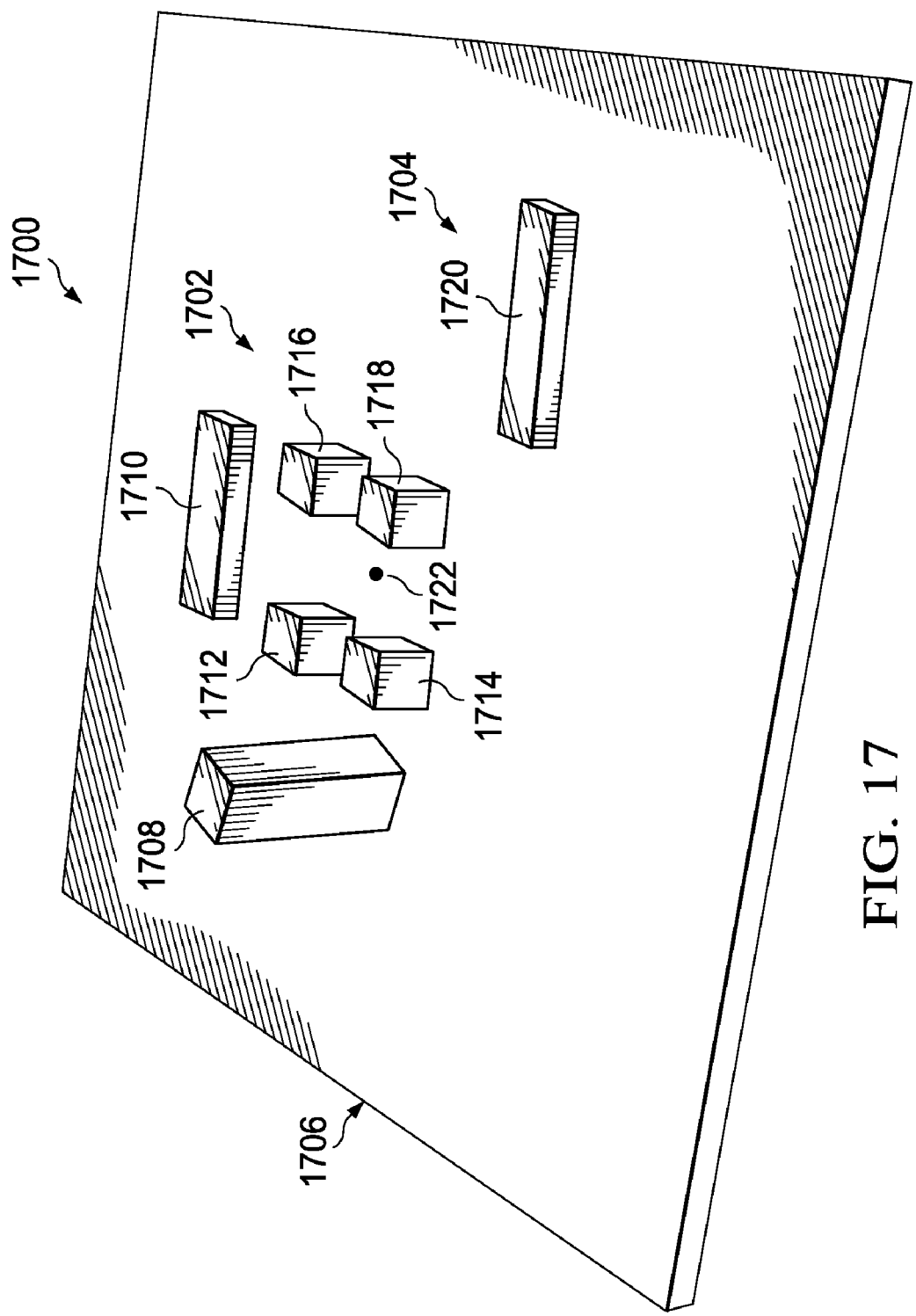
FIG. 17 is an illustration of a perspective view of a model of a number of objects in an environment in accordance with an advantageous embodiment.

With reference now to FIG. 17, an illustration of a perspective view of a model of a number of objects in an environment is depicted in accordance with an advantageous embodiment. In this illustrative example, model 1700 presents boundary 1702 for number of objects 1704 in environment 1706. Number of objects 1704 includes object 1708, object 1710, object 1712, object 1714, object 1716, object 1718, object 1720, and target 1722. Model 1700 may be generated using volumes formed using values generated by a first function, such as first function 230 in FIG. 2 and/or first function 306 in FIG. 3. In this illustrative example, the first function uses a different geometric representation for number of objects 1704 to generate the values.

Figure 18:
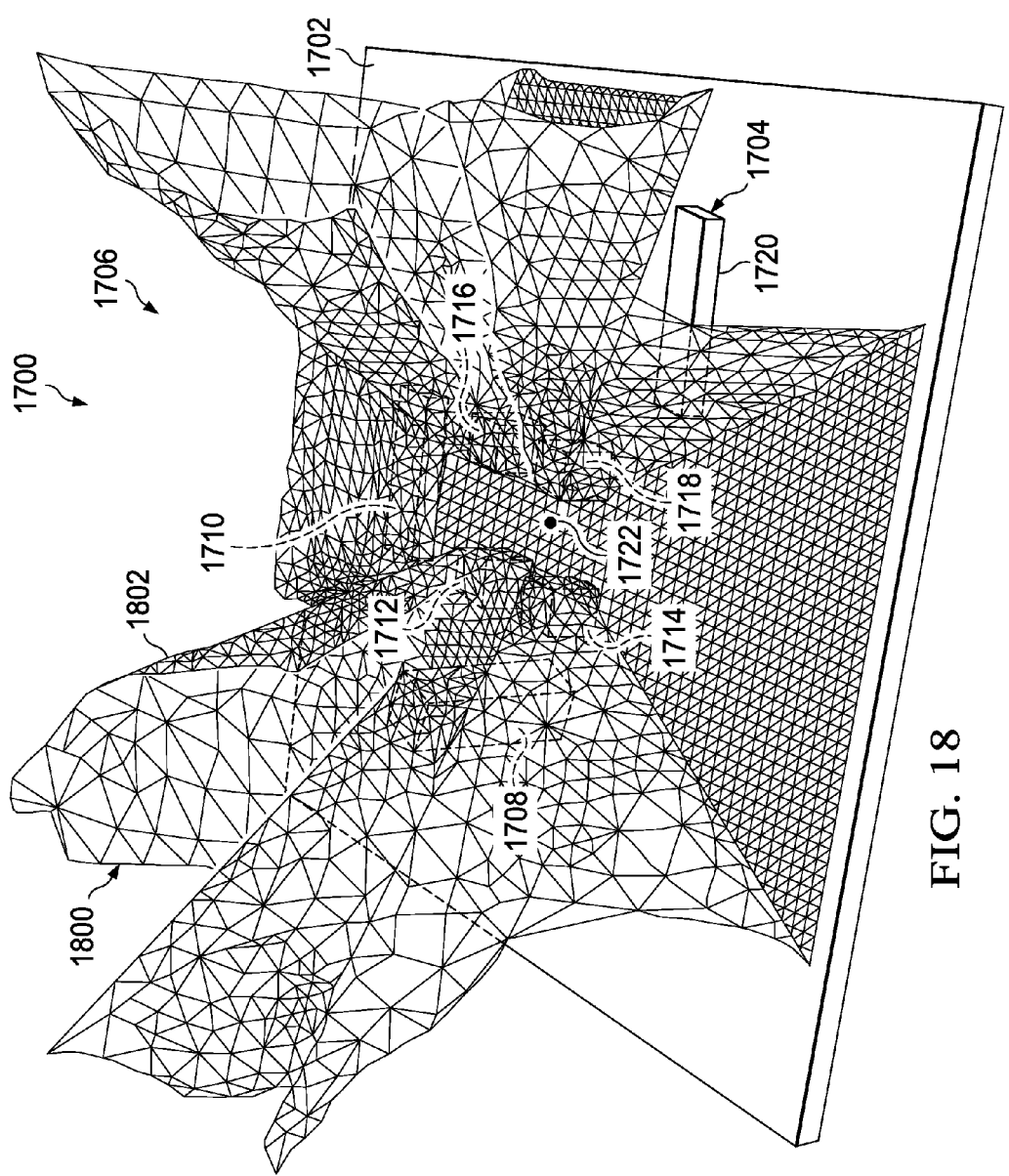
FIG. 18 is an illustration of a perspective view of two models in accordance with an advantageous embodiment.

With reference now to FIG. 18, an illustration of a perspective view of two models is depicted in accordance with an advantageous embodiment. In this illustrative example, model 1700 in FIG. 17 is shown with model 1800. Model 1800 is a model of visibility for number of objects 1704. Model 1800 presents boundary 1802 for a selected visibility of number of objects 1704. This selected visibility has a value of zero in this depicted example.

Figure 19:
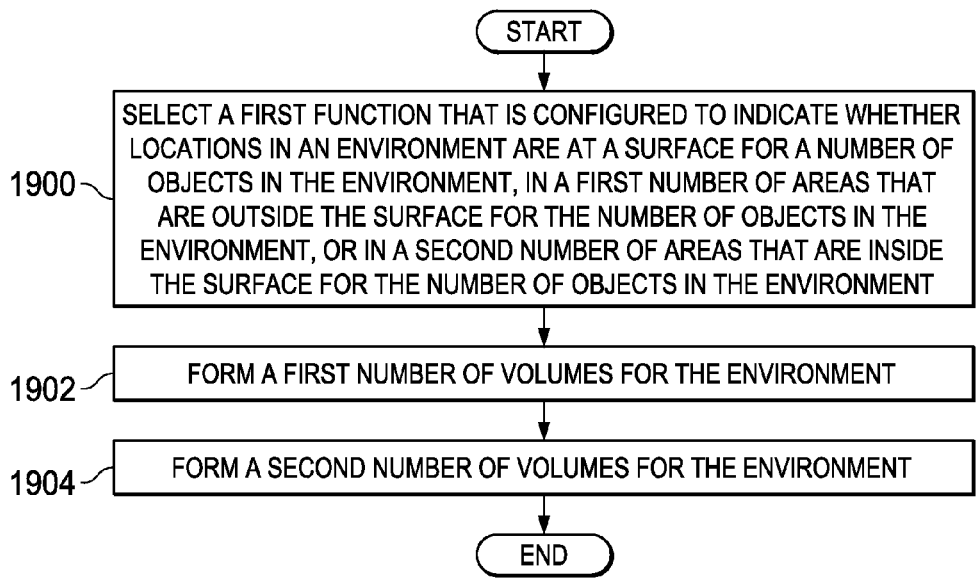
FIG. 19 is an illustration of a flowchart of a process for identifying visibility of objects in accordance with an advantageous embodiment.

With reference now to FIG. 19, an illustration of a flowchart of a process for identifying visibility of objects is depicted in accordance with an advantageous embodiment. The process illustrated in FIG. 19 may be implemented for identifying visibility of targets in an environment, such as environment 100 in FIG. 1, environment 202 in FIG. 2, and/or environment 800 in FIG. 8.

Further, the process may be implemented using a visibility identification process, such as, for example, visibility identification process 214 in FIG. 2 and/or visibility identification process 300 in FIG. 3. The visibility identification process may be run on a computer system, such as computer system 204 in FIG. 4.

The process begins by selecting a first function that is configured to indicate whether locations in an environment are at a surface for a number of objects in the environment, in a first number of areas that are outside the surface for the number of objects in the environment, or in a second number of areas that are inside the surface for the number of objects in the environment (operation 1900). In operation 1900, the first function takes the form of a signed distance function.

The process then forms a first number of volumes for the environment (operation 1902). Each volume in the first number of volumes has a size selected such that a difference between a first number of interpolated values for each volume and a first number of values generated using the first function for each volume is within a first threshold. The first number of interpolated values and the first number of values are generated for the same number of locations in each volume.

Thereafter, the process forms a second number of volumes for the environment (operation 1904), with the process terminating thereafter. Each volume in the second number of volumes has a size selected such that a difference between a second number of interpolated values for each volume and a second number of values generated using a second function for each volume is within a selected threshold. The second number of interpolated values and the second number of values are generated for the same number of locations in each volume.

The second number of values generated using the second function is a number of minimum values along a number of lines from each volume in the second number of volumes to a target in the environment. The number of lines is a number of lines of sight from different locations in the environment to the target.

Figure 20:
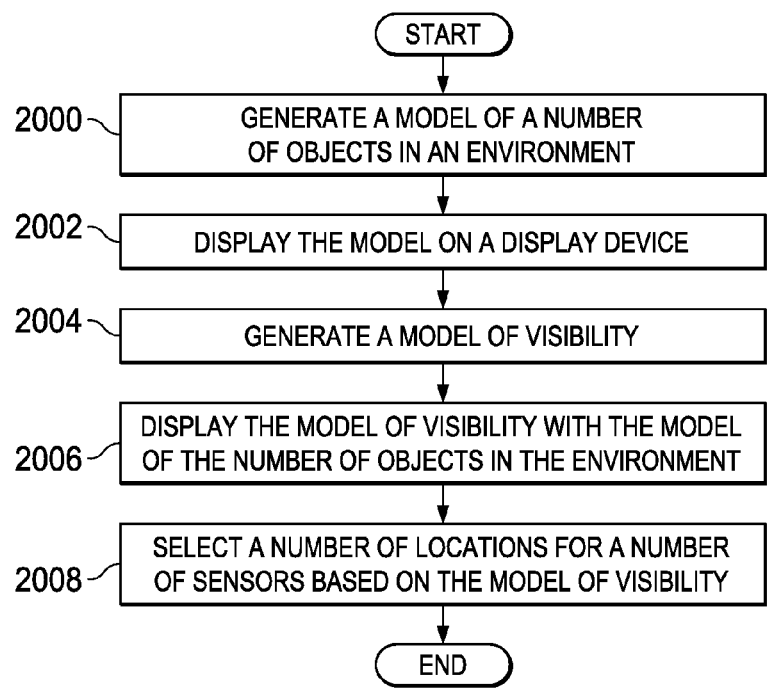
FIG. 20 is an illustration of a flowchart of a process for identifying a number of locations for a number of sensors based on the visibility of a target in accordance with an advantageous embodiment.

With reference now to FIG. 20, an illustration of a flowchart of a process for identifying a number of locations for a number of sensors based on the visibility of a target is depicted in accordance with an advantageous embodiment. The process illustrated in FIG. 20 may be implemented using visibility identification process 214 running on computer system 204 in FIG. 2. Further, this process may be performed after performing the process illustrated in FIG. 19.

The process begins by generating a model of a number of objects in an environment (operation 2000). In operation 2000, the model is generated using the first number of volumes formed in operation 1902 in FIG. 19. The model indicates a boundary for the number of objects in the environment. In this example, the boundary is the surface for the number of objects. The model displayed may be, for example, model 900 in FIGS. 9-16 or model 1700 in FIG. 17.

The process then displays the model on a display device (operation 2002). The model may be displayed to present a view of the surface of the number of objects. Thereafter, the process generates a model of visibility (operation 2004). In operation 2004, the model of visibility is generated using the second number of volumes formed in operation 1904 in FIG. 19.

The process then displays the model of visibility with the model of the number of objects in the environment (operation 2006). The model displayed may be, for example, model 1000 in FIGS. 10, 11, 12, 14, and 16.

Thereafter, the process selects a number of locations for a number of sensors based on the model of visibility (operation 2008), with the process terminating thereafter. In operation 2008, this selection may be made by a process running on the computer system or by an operator using the visibility identification process running on the computer system. An operator may determine in which of the number of locations to place the number of sensors.

Figure 21A:
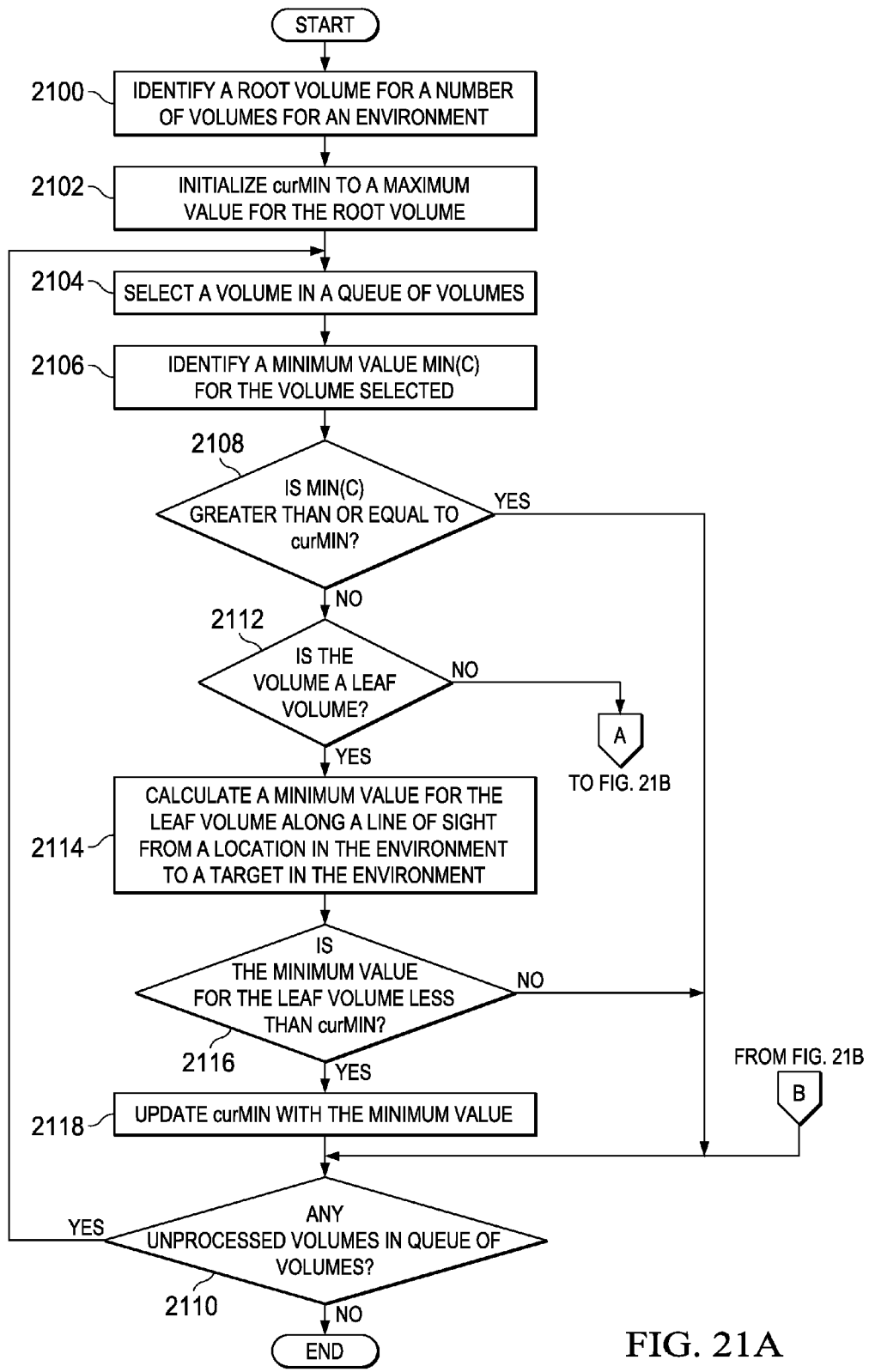
FIGS. 21A and 21B are illustrations of a flowchart of a process for generating values for a function in accordance with an advantageous embodiment.
Figure 21B:
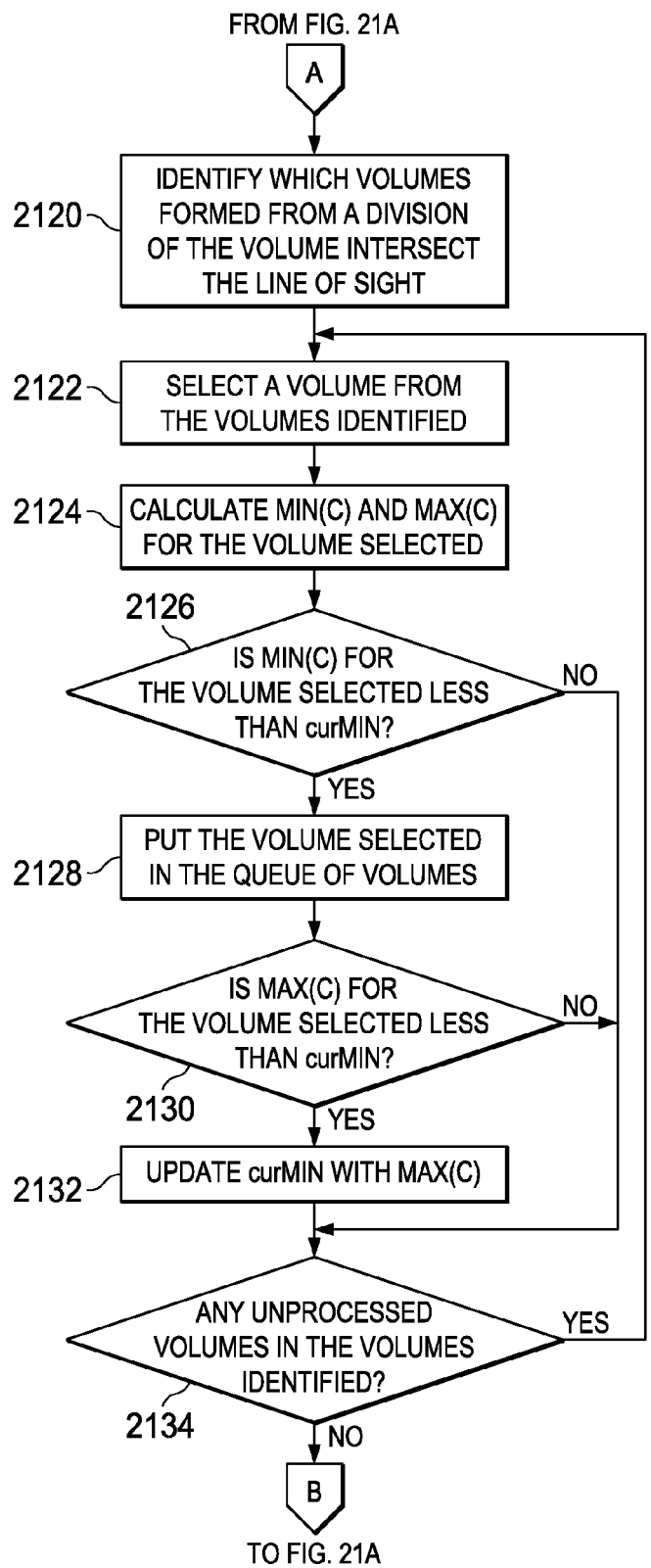

With reference now to FIGS. 21A and 21B, an illustration of a flowchart of a process for generating values for a function is depicted in accordance with an advantageous embodiment. The process illustrated in FIGS. 21A and 21B may be implemented by second volume generation process 224 using second function 246 in FIG. 2 and/or second volume generation process 304 using second function 334 in FIG. 3.

Further, the process may be implemented to generate values that indicate a visibility of targets in an environment. In particular, the process illustrated in FIGS. 21A and 21B identifies a minimum value along a line of sight from a location in an environment to a target in the environment.

The process begins by identifying a root volume for a number of volumes for an environment (operation 2100). The root volume is the initial volume formed for the environment using the adaptive distance field process. In other words, the root volume is the first volume formed for the environment prior to any divisions of the root volume. In these illustrative examples, the root volume is the largest volume that encompasses the entire environment. In operation 2100, the number of volumes is, for example, first number of volumes 238 in FIG. 2 and/or first number of volumes 308 in FIG. 3.

The process then initializes the variable, curMin, to a maximum value for the root volume (operation 2102). In operation 2102, the maximum value for the root volume is the maximum value from the values for the vertices of the root volume.

Thereafter, the process selects a volume in a queue of volumes (operation 2104). The first volume in the queue of volumes is the root volume. In operation 2104, the volume selected may be comprised of a number of volumes. For example, the volume may be a volume that was divided into smaller volumes. The process identifies a minimum value for the volume selected (operation 2106).

In operation 2106, a maximum value for the volume selected may also be identified. Further, the minimum value and the maximum value for the volume selected may be identified by performing calculations or may be identified from prior calculations performed.

In operation 2106, the minimum value and the maximum value for the volume may be calculated using:

$$\min(c) = \begin{cases} \min(H_c) & \text{if } Q_c = \phi \\ \min(Q_c) & \text{otherwise} \end{cases}$$

$$\max(c) = \begin{cases} \max(H_c) & \text{if } Q_c = \phi \\ \max(Q_c) & \text{otherwise} \end{cases}$$

where c is the volume selected, min(c) is the minimum value for the volume c, and max(c) is the maximum value for the volume c. Further, $H_c$ is the set of values for the vertices of volume c, and $Q_c$ is the set of volumes within volume c.

If c is a leaf volume, the set of $Q_c$ is empty and is a null set. A null set is represented as Ø. A leaf volume is a volume that is not divided into smaller volumes in the number of volumes for the environment.

In this manner, when volume c is a leaf volume, min(c) is the minimum value from the values for the vertices of volume c, and max(c) is the maximum value from the values for the vertices of volume c. Further, when volume c is not a leaf volume, min(c) is the minimum value from the values for the vertices of all of the volumes within volume c, and max(c) is the maximum value from the values for the vertices of all of the volumes within volume c.

Thereafter, the process determines whether min(c) is greater than or equal to curMin (operation 2108). If min(c) is greater than or equal to curMin, the process determines whether there are any unprocessed volumes in the queue of volumes (operation 2110). If there are unprocessed volumes in the queue, the process returns to operation 2104 as described above. If there are no unprocessed volumes in the queue, the process terminates.

With reference again to operation 2108, if min(c) is not greater than or equal to curMin, the process determines whether the volume is a leaf volume (operation 2112). If the volume is a leaf volume, the process calculates a minimum value for the leaf volume along a line of sight from a location in the environment to a target in the environment (operation 2114).

In operation 2114, the line of sight from the location in the environment to the target in the environment is the segment s.

In operation 2114, the minimum value for the leaf volume along the line of sight is calculated using:

$$\text{minfield}_c(s) = \min_{p \in c \cap s}(h_c(p)),$$

where minfield is the minimum value for the leaf volume along the line of sight, p is the coordinate location for the location in the environment where $h_c$ is the distance field for volume c. In other words, $h_c$ contains the interpolated values for volume c as well as the values at the vertices for volume c.

Let s* be the restriction of s to volume c. In this example, s* is defined in parametric form in the unit cube $[0,1]^3$. The normalized parameterization of s* in volume c is:

$$s^* : [0, 1] \to [0, 1]^3$$
$$s*(t) = t \cdot n + a$$

where, $$a = (a_x, a_y, a_z)$$
$$n = [n_x, n_y, n_z]^T$$

in which a is the origin of s, n is the direction of s, and t is the parameter defined in [0,1]. In other words, each value of t corresponds to a point in segment s.

$$h_c(x, y, z) = Axyz + Bxy + Cyz + Dxz + Ex + Fy + Gz + 1, \text{ where}$$
$$A = h_1 + h_3 + h_4 - (h_0 + h_2 + h_5 + h_7)$$
$$B = h_0 + h_2 - (h_1 + h_3)$$
$$C = h_0 + h_4 - (h_3 + h_7)$$
$$D = h_0 + h_5 - (h_1 + h_4)$$
$$E = h_1 - h_0$$
$$F = h_3 - h_0$$
$$G = h_4 - h_0$$

Let $h_c^s$ be the distance field of volume c evaluated along s* such that:

$$h_c^* = h_c \circ s^*, \text{ then}$$
$$\text{minfield}(c, s) = \min_{t \in [0,1]}(h_c^s(t)).$$

It follows that $h_c^s(t) = A't^3 + B't^2 + C't + D'$ with $$A' = A n_x n_y n_z$$
$$B' = n_x n_y (B + A a_z) + n_y n_z (C + A a_x) + n_x n_z (D + A a_y)$$
$$C' = A(a_x a_y n_z + a_x n_y a_z + n_x a_y a_z) + B(a_x n_y + a_y n_x) +$$
$$\quad C(a_y n_z + a_z n_y) + D(a_x n_z + a_z n_x) +$$
$$\quad E n_x + F n_y + G n_z$$
$$D' = A a_x a_y a_z + B a_x a_y + C a_y a_z + D a_x a_z + E a_x + F a_y + G a_z + 1$$
$$\quad = h_c(a)$$

In this example, $h_c^s(t)$ is in the form of a cubic polynomial. It admits at most two extrema at the parametric values $t_0$ and $t_1$ such that $h_c^{s'}(t_0) = h_c^{s'}(t_1) = 0$ where $h_c^{s'}$ is the first derivative of $h_c^s$. If these values fall inside [0,1], then $h_c^s(t_0)$ and $h_c^s(t_0)$ are potential candidates to be the absolute minimum of $h_c^s$ along with $h_c^s(0)$ and $h_c^s(1)$. Let S be the set of parameter values that are potential candidates. Then minfield(c, s) is of the form:

$$\text{minfield}(c, s) = \min_{t \in S}(h_c^s(t)).$$

The clamping function is as follows:

$$\text{clamp}(t) = \min(\max(0, t), 1).$$

The method to solve for $t_0$ and $t_1$ depends on the degree of: 3, 2, 1, or 0. Each of these four cases is solved below.

Degree 3: $A' \neq 0$ $$h_c^{s'}(t) = 3A't^2 + 2B't + C'$$

The roots of $h_c^{s'}$ are solved by computing the determinant:

$$\Delta = 4B'^2 - 12A'C'.$$

Depending on the sign of $\Delta$, the following candidate sets are obtained:

$$S = \begin{cases} \{0, \text{clamp}(t_0), \text{clamp}(t_1), 1\} & \text{if } \Delta > 0 \text{ with } \begin{array}{l} t_0 = \dfrac{-2B' - \sqrt{\Delta}}{6A'} \\ t_1 = \dfrac{-2B' + \sqrt{\Delta}}{6A'} \end{array} \\ \{0, \text{clamp}(t_0), 1\} & \text{if } \Delta = 0 \text{ with } t_0 = t_1 = \dfrac{-2B'}{6A'} \\ \{0, 1\} & \text{if } \Delta < 0 \text{ (no real solution)} \end{cases}$$

Degree 2: $A' = 0$ and $B' \neq 0$ $$h_c^{s'}(t) = 2B't + C'.$$

The root is:

$$t_0 = -\frac{C'}{2B'}.$$

The candidate set is: $S = \{0, \text{clamp}(t_0), 1\}$.

Degree 1: $A' = 0$, $B' = 0$ and $C' \neq 0$ $$h_c^{s'}(t) = C' \text{ has no roots.}$$

The candidate set is: $S = \{0, 1\}$.

Degree 0: $A' = 0$, $B' = 0$ and $C' = 0$

The distance field is constant.

The candidate set is: $S = \{0\}$.

The process determines whether the minimum value for the leaf volume along the line of sight is less than curMin (operation 2116). If the minimum value for the leaf volume along the line of sight is less than curMin, the process updates curMin with the minimum value (operation 2118). The process then continues to operation 2110 as described above.

If the minimum value for the leaf volume along the line of sight is not less than curMin, the process returns to operation 2110 as described above.

With reference again to operation 2112, if the volume is not a leaf volume, the process identifies which volumes formed from a division of the volume intersect the line of sight (operation 2120). The process then selects a volume from the volumes identified (operation 2122). Thereafter, the process calculates min(c) and max(c) for the volume selected (operation 2124).

The process determines whether min(c) for the volume selected is less than curMin (operation 2126). If min(c) for the volume selected is less than curMin, the process puts the volume selected in the queue of volumes (operation 2128). The process then determines whether max(c) for the volume selected is less than curMin (operation 2130). If max(c) is less than curMin, the process updates curMin with max(c) (operation 2132).

Thereafter, the process determines whether any unprocessed volumes are present in the volumes identified in operation 2120 (operation 2134). If any unprocessed volumes are present, the process returns to operation 2122 as described above. If no unprocessed volumes are present, the process returns to operation 2110 as described above.

With reference again to operation 2130, if max(c) for the volume selected is not less than curMin, the process continues to operation 2134 as described above. With reference again to operation 2126, if min(c) for the volume selected is not less than curMin, the process continues to operation 2134 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a bus system. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying visibility of targets, the method comprising:
   selecting, by a computer system, a first function that is configured to indicate whether locations in an environment are at a surface for a number of objects in the environment, in a first number of areas that are outside the surface for the number of objects in the environment, or in a second number of areas that are inside the surface for the number of objects in the environment;
   forming, by the computer system, a first number of volumes for the environment, wherein each volume in the first number of volumes has a size selected such that a difference between a first number of interpolated values for the each volume in the first number of volumes and a first number of values generated using the first function for the each volume in the first number of volumes is within a first threshold; and
   forming, by the computer system, a second number of volumes for the environment in which each volume in the second number of volumes has a size selected such that a difference between a second number of interpolated values for the each volume in the second number of volumes and a second number of values generated using a second function for the each volume in the second number of volumes is within a second threshold, wherein the second number of values generated using the second function is a number of minimum values along a number of lines from the each volume in the second number of volumes to a target in the environment.

2. The method of claim 1, wherein the first number of volumes in the environment is for a model of the number of objects in the environment and wherein values for vertices of the first number of volumes indicate distances of the vertices from the surface for the number of objects in which the vertices correspond to a portion of the locations in the environment.

3. The method of claim 2 further comprising:
displaying the model of the number of objects in the environment on a display device, wherein the model identifies a boundary for the number of objects and wherein the boundary is selected from one of the surface for the number of objects and a distance away from the surface for the number of objects.

4. The method of claim 3, wherein values generated using the first function are substantially equal to zero at the boundary when the boundary is selected as the surface for the number of objects.

5. The method of claim 1, wherein the second number of volumes in the environment is for a model of visibility of the target in the environment, wherein values for vertices of the second number of volumes indicate the visibility of the target from the vertices in which the vertices correspond to a portion of the locations in the environment.

6. The method of claim 5 further comprising:
selecting a number of locations for a number of sensors based on the model of the visibility of the target in the environment.

7. The method of claim 6 further comprising:
placing the number of sensors in the number of locations selected based on the model of the visibility of the target in the environment.

8. The method of claim 1, wherein the first function generates a positive value in the first number of areas that are the outside the surface of the number of objects, a negative value in the second number of areas that are inside the surface of the number of objects, and a zero value at the surface for the number of objects.

9. The method of claim 1, wherein the second function generates a positive value when a line of sight from a location to the target in the environment is unblocked, a negative value when the line of sight from the location to the target in the environment is blocked, and the zero value when the line of sight from the location to the target in the environment intersects a surface of an object in the number of objects.

10. The method of claim 1, wherein the first function is a distance function and the second function is a visibility function.

11. The method of claim 1, wherein the first number of volumes and the second number of volumes are formed using an adaptive distance field process.

12. A method for identifying visibility of targets, the method comprising:
selecting, by a computer system, a signed distance function that is configured to generate values for locations in an environment, wherein the values indicate whether the locations are at a surface for a number of objects in the environment, in a first number of areas that are outside the surface for the number of objects in the environment, or in a second number of areas that are inside the surface for the number of objects in the environment and wherein each value in the values indicates how close a location in the locations in the environment is to the surface for the number of objects;
forming, by the computer system, a first number of volumes for the environment using an adaptive distance field process, wherein each volume in the first number of volumes has a size selected such that a difference between a first number of interpolated values for the each volume in the first number of volumes and a first number of values generated using the signed distance function for the each volume in the first number of volumes is within a first threshold; and
forming, by the computer system, a second number of volumes for the environment using the adaptive distance field process in which each volume in the second number of volumes has a size selected such that a difference between a second number of interpolated values for the each volume in the second number of volumes and a second number of values generated using a visibility function for the each volume in the second number of volumes is within a second threshold, wherein the second number of values generated using the visibility function is a number of minimum values along a number of lines of sight from the each volume in the second number of volumes to a target in the environment.

13. The method of claim 12, wherein the second number of volumes in the environment is for a visibility field for the target in the environment and wherein values for vertices of the second number of volumes indicate the visibility of the target from the vertices in which the vertices correspond to a portion of the locations in the environment.

14. An apparatus comprising:
a computer system configured to create a model for placing a number of sensors, wherein the computer system is configured to select a first function that is configured to indicate whether locations in an environment are at a surface for a number of objects in the environment, in a first number of areas that are outside the surface for the number of objects in the environment, or in a second number of areas that are inside the surface for the number of objects in the environment; form a first number of volumes for the environment, wherein each volume in the first number of volumes has a size selected such that a difference between a first number of interpolated values for the each volume in the first number of volumes and a first number of values generated using the first function for the each volume in the first number of volumes is within a first threshold; and form a second number of volumes for the environment in which each volume in the second number of volumes has a size selected such that a difference between a second number of interpolated values for the each volume in the second number of volumes and a second number of values generated using a second function for the each volume in the second number of volumes is within a second threshold, wherein the second number of values generated using the second function is a number of minimum values along a number of lines from the each volume in the second number of volumes to a target in the environment.

15. The apparatus of claim 14, wherein the first number of volumes in the environment is for a model of the number of objects in the environment and wherein values for vertices of the first number of volumes indicate distances of the vertices from the surface for the number of objects in which the vertices correspond to a portion of the locations in the environment.

16. The apparatus of claim 14, wherein the second number of volumes in the environment is for a model of visibility of the target in the environment, wherein values for vertices of the second number of volumes indicate the visibility of the target from the vertices in which the vertices correspond to a portion of the locations in the environment.

17. The apparatus of claim 16, wherein the computer system is further configured to select a number of locations for the number of sensors based on the model of the visibility of the target in the environment.

18. The apparatus of claim 17 further comprising:
the number of sensors, wherein the number of sensors is configured to be placed in the number of locations.

19. The apparatus of claim 14, wherein the first function generates a positive value in the first number of areas that are outside the surface of the number of objects, a negative value in the second number of areas that are inside the surface of the number of objects, and a zero value at the surface for the number of objects.

20. The apparatus of claim 14, wherein the second function generates a positive value when a line of sight from a location to the target in the environment is unblocked, a negative value when the line of sight from the location to the target in the environment is blocked, and a zero value when the line of sight from the location to the target in the environment intersects a surface of an object in the number of objects.

\* \* \* \* \*